US007202973B2

(12) United States Patent
Yamamoto et al.

(10) Patent No.: US 7,202,973 B2
(45) Date of Patent: Apr. 10, 2007

(54) PATCH MEASUREMENT DEVICE

(75) Inventors: Takaharu Yamamoto, Kyoto (JP); Tsuyoshi Okuda, Kyoto (JP)

(73) Assignee: Dainippon Screen MFG. Co., Ltd., Kyoto (JP)

( * ) Notice: Subject to any disclaimer, the term of this patent is extended or adjusted under 35 U.S.C. 154(b) by 1031 days.

(21) Appl. No.: 10/186,711

(22) Filed: Jul. 2, 2002

(65) Prior Publication Data

US 2003/0011798 A1 Jan. 16, 2003

(30) Foreign Application Priority Data

Jul. 4, 2001 (JP) ............................. 2001-203848
Jul. 23, 2001 (JP) ............................. 2001-221618
Jun. 7, 2002 (JP) ............................. 2002-167609

(51) Int. Cl.
*H04N 1/46* (2006.01)
*G06K 15/00* (2006.01)

(52) U.S. Cl. ........................ 358/1.9; 358/504; 358/520

(58) Field of Classification Search ................. 358/1.9, 358/2.1, 500, 518, 504, 520, 530
See application file for complete search history.

(56) References Cited

U.S. PATENT DOCUMENTS 4,003,660 A 1/1977 Christie, Jr. et al.
5,182,721 A 1/1993 Kipphan et al.
RE35,495 E 4/1997 Bolza-Schuenemann et al.
5,724,259 A 3/1998 Seymour et al.
5,754,676 A 5/1998 Komiya et al.
5,978,506 A 11/1999 Murayama et al.
5,992,318 A 11/1999 DiBello et al.
6,041,708 A 3/2000 Kipphan et al.
6,100,982 A 8/2000 Tobias et al.
6,109,183 A 8/2000 Papritz et al.
6,192,801 B1 2/2001 Papritz et al.
6,222,648 B1 * 4/2001 Wolf et al. ................. 358/504

(Continued)

FOREIGN PATENT DOCUMENTS

EP 0 518 559 12/1992

(Continued)

*Primary Examiner*—Jerome Grant, II
(74) *Attorney, Agent, or Firm*—McDermott Will & Emery LLP

(57) ABSTRACT

In a patch measurement device, a data storage section stores printed-image data including a control strip on a printed material. Based on the pixel values constituting printed-image data stored in the data storage section, a patch position detection section detects the position of a patch. A color density measurement section measures the color density of the patch whose position has been detected by the patch position detection section. A correlation coefficient ρm between a key pattern x and subject data y which is calculated by a reference mark detection section is represented as $\rho m=([x]*[y])-([x]^{-1}*[y])$, where [x]*[y] is a sum of multiplication products of corresponding elements of the two matrices. Matrix $[x]^{-1}$ represents an inverted pattern of the key pattern x. Even if the subject data y is of an unrelated pattern resembling the key pattern x having different signal levels from those of the key pattern x, the resultant correlation coefficient ρm has a small value, thereby indicative of a low correlation. The resultant correlation coefficient ρm also becomes small if the subject data y is that of a solid patch, due to cancellation by a drastic subtraction.

32 Claims, 17 Drawing Sheets

U.S. PATENT DOCUMENTS

| | | | |
|---|---|---|---|
| 6,366,358 B1 | 4/2002 | Satou et al. | |
| 6,446,555 B1 | 9/2002 | Schramm et al. | |
| 6,853,464 B1 * | 2/2005 | Ueda et al. | 358/1.9 |
| 2002/0043166 A1 * | 4/2002 | Okuda | 101/181 |
| 2002/0135788 A1 * | 9/2002 | Arakawa et al. | 358/1.1 |
| 2004/0001210 A1 * | 1/2004 | Chu et al. | 358/1.9 |

FOREIGN PATENT DOCUMENTS

| | | | | |
|---|---|---|---|---|
| EP | 0 705 784 | A2 | | 4/1996 |
| EP | 0 836 941 | A1 | | 4/1998 |
| EP | 1 149 703 | | | 4/2000 |
| EP | 1 084 843 | A1 | | 3/2001 |
| JP | 62-130344 | | | 6/1987 |
| JP | 06-079853 | | | 3/1994 |
| JP | 07-284090 | | | 10/1995 |
| JP | 09-186900 | | | 7/1997 |
| JP | 09-201947 | | | 8/1997 |
| JP | 2824334 | | | 4/1998 |
| JP | 11-48456 | | | 2/1999 |
| JP | 2001-138489 | | | 5/2001 |
| JP | 2003-103762 | | | 4/2003 |
| JP | 020003103762 | A | * | 4/2003 |
| JP | 2003-311933 | | | 11/2003 |
| JP | 2003-326678 | | | 11/2003 |
| JP | 02003311933 | A | * | 11/2003 |
| JP | 02003326678 | A | * | 11/2003 |

* cited by examiner

PATCH MEASUREMENT DEVICE

BACKGROUND OF THE INVENTION

1. Field of the Invention

The present invention relates to a patch measurement device, and more particularly to a patch measurement device, which can be incorporated in a printing apparatus, for measuring the color density of patches constituting a control strip which is printed on printing paper.

2. Related Art Statement

There have conventionally been realized printing apparatuses which incorporate a so-called CTP (Computer To Plate) device, i.e., a prepressing device (=a printing plate recording device) that generates an image on a printing plate based on "image-to-print data", i.e., data representing an image to be printed. A printing apparatus of this type, referred to as a digital printing press, is capable of producing printed materials directly from image data, and therefore may be suitable for producing a variety of printed materials, each in a relatively few copies, over short periods of time. While prepress and other processes in such a printing apparatus are automated for ease of operation by operators with insufficient proficiency, further automation is desired in the adjustment of the amounts of inks and/or dampening water to be supplied during a printing process.

The control of ink supply in a conventional printing apparatus is generally realized by means of a separate console-type color measurement device, where a produced sample print is measured on a table. In this case, there is a problem in that a human operator needs to take out sample prints from the printing apparatus as necessary to measure the colors appearing on the printed materials.

A printing apparatus which realizes automatic control of an ink supply amount, etc., is disclosed in Japanese Patent No. 2824334, for example. Hereinafter, the disclosed apparatus will be referred to as a "first conventional printing apparatus. The first conventional printing apparatus previously retains reference image data representing a printed material that serves as a reference against which to adjust the ink supply amount. Moreover, after producing a printed material on an internal impression cylinder, the first conventional printing apparatus generates "printed-image data", i.e., data representing the actually produced printed material. Furthermore, the first conventional printing apparatus compares the generated printed-image data and the reference image data to determine whether to increase or decrease the supply amounts of inks and/or dampening water. Based on the determination result, the first conventional printing apparatus automatically adjusts the ink supply amounts. Thus, the first conventional printing apparatus has an advantage in that, since printed-image data is generated within the printing apparatus, there is no need to bother an operator as in the case of employing a console-type color measurement device.

However, the printed-image data which is generated from an actually printed material tends to have a relatively large data size, and so does the reference image data. Therefore, the first conventional printing apparatus has a problem in that the comparison between the reference image data and the printed-image data consumes substantial time. Another problem is the need to prepare the reference image data in advance. In these respects, the first conventional printing apparatus is not suitable for producing relatively few copies of a variety of printed materials, where agility is of the essence.

Therefore, the Applicant has previously filed an application directed to a second conventional printing apparatus which realizes prompt adjustment of the ink supply amounts by printing not only an image of a subject of printing but also control strips (each comprising a number of patches) and reference marks on a printed material, and further generating printed-image data, which represents the control strips and the reference mark, by means of an internal imaging device. The second conventional printing apparatus further comprises a patch measurement device for measuring color density information of the printed patches on the basis of the printed-image data. The color density information may include, for example, the density and/or dot percentage of the printed patches. Thus, the second conventional printing apparatus compares the color density information obtained by means of the patch measurement device against a previously set reference value to determine whether to increase or decrease the supply amount of ink or dampening water. Based on this determination result, the second conventional printing apparatus adjusts the supply amount of ink or the like.

Now, the specific operation of the aforementioned patch measurement device will be described. FIG. 16A is a diagram illustrating a printed material S which may be obtained by using the second conventional printing apparatus. As shown in FIG. 16A, the second conventional printing apparatus prints an image im on printing paper, and thereafter prints four control strips cs1 to cs4 and three reference marks rm1 to rm3 on the same printing paper. Hereinafter, such four control strips cs1 to cs4 may collectively be referred to as "control strips cs", and the three reference marks rm1 to rm3 as "reference marks rm".

The image im is printed on the printing paper, beginning at a position (hereinafter referred to as a "print start position") which is located a predetermined gripper margin f away from the leading end of the printing paper. More specifically, the image im is progressively printed in the direction of print progress indicated by the arrow (hereinafter referred to as a "first printing direction"), beginning from the print start position. The image im has a dimension m along the first printing direction, which is designated according to the image size. The control strips cs and the reference marks rm are printed beginning at a position which is a predetermined distance n away from the trailing end of the image im.

As shown in FIG. 16A, the control strips cs are typically printed on the printing paper with predetermined intervals therebetween along a direction (hereinafter referred to as a "second printing direction") perpendicular to the first printing direction, and each control strip cs includes a plurality of rectangular-shaped patches arranged in a predetermined order. Each patch may be a half-tone, linework, or solid image which is printed at a predetermined density in a predetermined color. FIG. 16B illustrates an exemplary patch pc1.

As shown in FIG. 16A, the reference mark rm1 is interposed between two adjoining control strips cs2 and cs3. The reference mark rm2 is interposed between the control strips cs1 and cs2, and the reference mark rm3 is interposed between the control strips cs3 and cs4. As such, the reference marks rm1 to rm3 serve as references based on which to detect the positions of the control strips cs1 to cs4. Typically, as exemplified by the reference mark rm1 shown in FIG. 16B, a reference mark comprises two bars b1 and b2 which run parallel to the first printing direction, and a cross mark c interposed between the bars b1 and b2. Each patch is printed at a position which is predetermined distances away—along the first and second printing directions—from a crosspoint p of the cross mark c. For example, the patch pc1 is printed so that the center thereof is at a distance a (along the first printing direction) and at a distance b (along the second printing direction) from the crosspoint p of the reference mark rm1.

The printed-image data representing the printed material S is generated by capturing an image of the printed material S within the printing apparatus, and passed to the patch measurement device. Assuming that the patch pc1 is currently to be processed by the patch measurement device, the patch measurement device first detects the crosspoint p of the reference mark rm1. Furthermore, the patch measurement device estimates that a position which is at the distance a (along the first printing direction) and at the distance b (along the second printing direction) from the detected crosspoint p should be the center position of the patch pc1, which is currently to be processed. Thereafter, the patch measurement device measures the at the color density information of the patch pc1 at the estimated position.

On the other hand, each reference mark rm, which is printed in a single color of B (black), is a mark used for positioning purposes. On the immediately upper side of a region in which the control strips cs are printed (closer to where the image im is printed) is a predetermined blank region which is purposely left white, i.e., no images are printed. It is ensured that the bars b1 and b2 are longer than the width (along the first printing direction) of the region in which the control strips cs are printed, and long enough to encompass part of the blank region. Accordingly, any region in which a detectable portion of the bars b1 and b2 appears along the first printing direction can be determined as part of the region in which the control strips cs are printed, and/or part of the blank region.

In order to detect a reference mark rm from the printed-image data, the second conventional printing apparatus employs pattern recognition technique. The method for detecting a reference mark rm begins by previously obtaining a pixel pattern of the neighborhood of the center of the cross mark c interposed between the bars b1 and b2 in the reference mark rm. FIG. 17 illustrates an exemplary pixel pattern of an α region, which is in the neighborhood of the center of the cross mark c shown in FIG. 16B. For ease of understanding, the illustrated example is made purposely schematic. A center line β of the cross mark c consists of: two black pixels on each side (constituting the width of each of the bars b1 and b2); a white pixel interposed between a horizontal stroke of the cross mark c and each of the bars b1 and b2; and seven black pixels composing the entire horizontal stroke of the cross mark c. Next, it is determined whether or not the pixel pattern of the center line β shown in FIG. 17 is contained in the captured printed-image data while shifting the examined pixels one by one. This technique is applied with respect to each of the X and Y directions (which are perpendicular to each other) on a memory storing the printed-image data.

Correlation coefficients are employed in the calculations use for matching the pixel pattern against the printed-image data. For example, the pixel pattern of the above-described center line β can be expressed in a binary representation "1101111111011". Correlation coefficients ρ are sequentially calculated with respect to a key pattern x (i. e., the line β) and subject data y (i.e., data to be matched against the key pattern x), while shifting the subject data y by one pixel. Specifically, the line β used as the key pattern x is:

$$x=(1,1,0,1,1,1,1,1,1,1,0,1,1).$$

The subject data y is:

$$y=(y_{-6},y_{-5},y_{-4},y_{-3},y_{-2},y_{-1},y_0,y_{+1},\ y_{+2},y_{+3},y_{+4},y_{+5},y_{+6})$$

The correlation coefficient ρ is expressed as:

$$\rho=([x]*[y])/(\sigma x\times\sigma y).$$

Note, however, that the term [x]*[y] in the above equation is defined as a sum of the multiplication products of corresponding elements of the respective matrices, as opposed to a mathematical product (|x|*|y|) of the two matrices in the traditional sense. Specifically, if each matrix consists of one row×three columns, then $$(u1\,v1\,w1)*(u2\,v2\,w2)=(u1\times u2)+(v1\times v2)+(w1\times w2)$$

under the above definition. Note that σ x is a standard deviation of the key pattern x, and σ y is a standard deviation of the subject data y. The calculated correlation coefficients are compared, and the position associated with the highest correlation coefficient is regarded as the position of the reference mark rm.

Next, the problems associated with the above-described patch measurement device will be described. As mentioned above, each control strip cs includes a plurality of patches which are arranged along the second printing direction. In the case where there are fifteen ink keys in the printing apparatus, the total number of patches would be 60 or more. However, due to limited spaces being available for printing the patches pc and the reference marks rm, the total number of reference marks rm which are printed on the printing paper is disproportionately small relative to the large number of patches. Even if an increased number of reference marks rm is employed, it would only invite an increase in the detection frequency of the reference marks rm, thereby resulting in more time being consumed for measuring the color density information. In this respect, the total number of reference marks rm should be minimized. However, employing a small number of reference marks rm has a disadvantage in that the prescribed distance from each reference mark rm to each patch becomes more prone to error as the number of reference marks rm is decreased. Specifically, a greater error is expected for patches which are disposed father away from the reference mark rm. The effect of such errors is that the patch measurement device may erroneously measure the color density information related to positions not corresponding to the patch centers. Thus, inaccurate color density information may be obtained.

Moreover, the above-described printing apparatus is constructed so that printed-image data is generated as the printed material S is read by an internal imaging device. However, since the printed material S is read during its transportation, the read position of the printed material S may fluctuate. Moreover, due to recoil and like actions of the printed material S during its transportation, pixels which normally compose a rectangular-shaped patch may present a parallelogram or diamond-shaped congregation in the printed-image data. In that case, even if the distances a and b (for the first and second printing directions, respectively) are added to the coordinates of the crosspoint p which is detected from the printed-image data, the result may not indicate the proper center of the patch pc1. In this respect, too, the conventional patch measurement device may not be able to measure accurate color density information.

Furthermore, since the calculation of correlation coefficients used in the detection of the reference marks rm involves division by the standard deviations of the key pattern x and the subject data y, any pattern which happens to resemble the key pattern x may produce a large correlation coefficient ρ, irrespective of the data sizes (signal intensities) of the respective pixels, thus falsely indicating a strong correlation. In other words, if a pattern resembling the key pattern x happens to be present in the neighborhood of a reference mark rm due to flares in the optical system, print smears, and the like, that pattern may erroneously be recognized as a reference mark rm, however weak the signal levels of such pixels may be. This will hinder the detection of the actual reference mark rm, and an incorrect position may instead be detected. Consequently, since the position of the reference mark rm is not properly detected, it becomes impossible to detect the patches pc composing the associated control strips cs, so that the color density information of the patches pc cannot be measured.

SUMMARY OF THE INVENTION

Therefore, an object of the present invention is to provide a patch measurement device which can measure accurate color density information of patches composing a control strip based on accurate detection of the patch positions, even if the read position on the printed material fluctuates or if recoil or other actions of the printed material occur.

The present invention has the following features to attain the object above.

A first aspect of the present invention is directed to a patch measurement device for measuring color density of a patch in a control strip printed on paper, the paper having a reference mark for facilitating positioning printed at a predetermined distance from the patch, wherein the patch measurement device comprises: a storage section for storing imaged data representing at least the control strip and the reference mark on the paper; a reference mark detection section for detecting the reference mark based on the imaged data stored in the storage section; a pixel extraction section for extracting, from the imaged data stored in the storage section, pixels composing the patch and surrounding pixels by referring to the reference mark detected by the reference mark detection section; a patch position detection section for detecting a position of the patch based on values of the pixel extracted by the pixel extraction section; and a color density measurement section for measuring color density of the patch based on the value of at least one pixel located at the position detected by the patch position detection section.

According to the above-described structure, the pixel extraction section extracts pixels composing the patch and its surrounding periphery, based on the predetermined relative position of the patch with respect to the reference mark. Specifically, the pixel extraction section roughly selects the patch and its surrounding pixels. Thereafter, the patch position detection section detects the patch position from the pixels extracted by the pixel extraction section. As a result, the patch position can be detected fast and accurately. Thus, a patch measurement device which is capable of accurate color density measurement can be provided.

The patch position detection section may comprise: a data sequence extraction section for extracting a predetermined number of data sequences from the pixels extracted by the pixel extraction section, each data sequence being composed of a predetermined number of pixel values encompassing a portion of the patch; and a distribution calculation section for calculating, for each data sequence extracted by the data sequence extraction section, a distribution profile of the pixel values composing the data sequence, wherein the patch position detection section may detect the position of the patch based on the distribution profiles calculated by the distribution calculation section. Thus, the patch position can be detected accurately and efficiently.

The distribution calculation section may input the pixel values composing each data sequence to a predetermined function to calculate a kurtosis of the distribution profile, wherein the patch position detection section may detect a center of the patch based on the kurtoses calculated by the distribution calculation section, and wherein the color density measurement section may measure the color density of the patch based on the value of at least one pixel located at the center of the patch detected by the patch position detection section. In this case, the center of the patch can be detected as the patch position, thereby realizing stable color density measurement.

The predetermined function may be a Kurt function. Thus, the patch position can be easily detected.

The patch printed on the paper may be rectangular-shaped; the imaged data may include M×N pixels (where M and N are natural numbers) representing the patch, along a first dimension direction and a second dimension direction, respectively, wherein the second dimension direction is perpendicular to the first dimension direction, wherein, from the imaged data stored in the storage section, the pixel extraction section may extract P×Q pixel values composing the patch and a surrounding periphery thereof by referring to the reference mark detected by the reference mark detection section, wherein P is the number of pixels present along the first dimension direction and Q is the number of pixels present along the second dimension direction, wherein, from each row of P pixels present along the first dimension direction extracted by the pixel extraction section, the data sequence extraction section may extract data sequences each composed of R pixel values (where R is a natural number smaller than P), the respective data sequences being shifted by one pixel along the first dimension direction and containing different sets of R pixel values, wherein, for each data sequence, the distribution calculation section may input the R pixel values composing the data sequence to the predetermined Kurt function to calculate the kurtosis of the distribution profile, and wherein, based on the kurtoses of the distribution profiles calculated by the distribution calculation section, the patch position detection section may detect a center of the patch for each of the Q rows present along the second dimension direction. In this case, the pixel extraction section extracts pixels composing the patch and its surrounding periphery, based on the predetermined relative position of the patch with respect to the reference mark. Specifically, the pixel extraction section roughly selects P×Q pixels composing the patch and its surrounding periphery. Thereafter, the patch position detection section detects the patch position from the P×Q pixels extracted by the pixel extraction section. As a result, the patch position detection section can detect the patch center position fast and accurately.

R may be an odd number greater than M. Thus, the pixel extraction section extracts data sequences each composed of R pixel values, where R is an odd number greater than the first dimension of the patch. As a result, the patch position detection section can detect the patch center position with certainty.

The reference mark detection section may comprise: an image pattern extraction section for extracting from the imaged data an image pattern approximately corresponding to a predetermined reference pixel pattern of the reference mark, the image pattern being sequentially shifted by a predetermined number of pixels; a correlation coefficient calculation section for calculating a correlation coefficient by subtracting, from a sum of multiplication products of corresponding elements of the reference pixel pattern and the image pattern, a sum of multiplication products of corresponding elements of an inverted pixel pattern of the reference pixel pattern and the image pattern; and a reference mark position detection section for detecting a maximum value among a number of said correlation coefficients calculated by the correlation coefficient calculation section, and determining the position of the pixel associated with the maximum value as the position of the reference mark on the paper. Thus, by calculating a correlation coefficient with respect to a reference pixel pattern representing the reference mark by means of the correlation coefficient calculation section, whereby the signal levels and shape thereof can be known with certainty. Therefore, the reference mark can be accurately detected from the paper. Thus, a clearly high correlation can be detected relative to any pixels having signal levels close to those of the key pattern or any pattern resembling the key pattern due to flares in the optical system, print smears, and the like. The calculation of correlation coefficients can be realized by employing a simple formula, without having to calculate conventionally-used standard deviations. Thus, the reference mark detection process is facilitated, and the processing speed can be enhanced.

The calculation of the correlation coefficient by the correlation coefficient calculation section may comprise dividing the reference pixel pattern and the inverted pixel pattern, each by a weighting factor representative of a pattern shape of the respective pattern. In this case, correlation coefficients are calculated by applying weighting in accordance with the reference pixel pattern. Thus, the correlation coefficients can be processed by using the same evaluation standard for reference pixel patterns having different shapes or signal levels.

The imaged data stored in the storage section may be generated for each of RGB colors, and wherein the correlation coefficient calculation section may calculate the correlation coefficient for imaged data of each of RGB colors, in accordance with the color of the reference mark. In this case, correlation coefficients are calculated for imaged data of each of RGB colors in accordance with the color of the reference mark. Thus, the patch measurement device can be employed without limitations on the color of the reference mark used.

The patch measurement device may be provided in a printing apparatus for printing a plurality of colors on the paper, and wherein the imaged data may be generated by imaging the control strip and the reference mark while the paper is being transported in a sheet form in the printing apparatus while being gripped at one end thereof. Thus, by employing the patch measurement device as an in-line component of a printing apparatus which is capable of multi-color printing, it is possible to measure the color density of the patch while the paper is being transported in a sheet form while being gripped at one end thereof.

The printing apparatus may be of a type including a prepressing mechanism for forming, based on image data representing a subject image to be printed, printing the subject image, the control strip and the reference mark on a printing plate. Thus, the color density of a patch which is produced through prepressing and printing in a printing apparatus which is capable of multi-color printing can be measured, and the measurement result can be used for controlling the printing apparatus.

A second aspect of the present invention is directed to a patch measurement device for measuring color density of a patch in a control strip printed on paper, wherein the patch measurement device comprises: a storage section for storing imaged data representing the control strip on the paper; a patch position detection section for detecting a position of the patch based on the values of pixels composing the imaged data stored in the storage section; and a color density measurement section for measuring color density of the patch whose position is detected by the patch position detection section.

The imaged data may comprise pixels representing the patch, and wherein the patch position detection section may comprise: a data sequence extraction section for extracting a predetermined number of data sequences from the imaged data stored in the storage section, each data sequence being composed of a predetermined number of pixel values encompassing a portion of the patch and a surrounding periphery thereof; and a distribution calculation section for calculating, for each data sequence extracted by the data sequence extraction section, a distribution profile of the pixel values composing the data sequence, wherein the patch position detection section may detect the position of the patch based on the distribution profiles calculated by the distribution calculation section.

The distribution calculation section may input the pixel values composing each data sequence to a predetermined function to calculate a kurtosis of the distribution profile, wherein the patch position detection section may detect a center of the patch based on the kurtoses calculated by the distribution calculation section, and wherein the color density measurement section may measure the color density of the patch based on the value of at least one pixel located at the center of the patch detected by the patch position detection section.

The predetermined function may be a Kurt function.

Thus, in accordance with the second aspect, the patch position detection section can directly derive a patch position from the pixels composing the imaged data, as opposed to the conventional technique of identifying a patch position based solely on the relative position of a patch with respect to reference mark. Thus, the patch position can be accurately detected. As a result, a patch measurement device which is capable of accurate color density measurement can be provided.

A reference mark may be printed on the paper at a predetermined distance from the patch; and the imaged data may comprise at least one pixel representing the reference mark, wherein the patch measurement device may further comprise a reference mark detection section for detecting the reference mark based on the imaged data stored in the storage section, and wherein the patch position detection section may further comprise a pixel extraction section for extracting, from the imaged data stored in the storage section, pixels composing the patch and surrounding pixels by referring to the reference mark detected by the reference mark detection section, and wherein the data sequence extraction section may extract a predetermined number of data sequences from the pixels extracted by the pixel extraction section, each data sequence being composed of a predetermined number of pixel values encompassing a portion of the patch. In this case, the pixel extraction section extracts pixels composing the patch and its surrounding periphery, based on the predetermined relative position of the patch with respect to the reference mark. Specifically, the pixel extraction section roughly selects the patch and its surrounding pixels. Thereafter, the patch position detection section detects the patch position from the pixels extracted by the pixel extraction section. As a result, the patch position can be detected fast and accurately.

The patch printed on the paper may be rectangular-shaped; the imaged data may include M×N pixels (where M and N are natural numbers) representing the patch, along a first dimension direction and a second dimension, respectively, wherein the second dimension direction is perpendicular to the first dimension direction, wherein, from the imaged data stored in the storage section, the pixel extraction section may extract P×Q pixel values composing the patch and a surrounding periphery thereof by referring to the reference mark detected by the reference mark detection section, wherein P is the number of pixels present along the first dimension direction and Q is the number of pixels present along the second dimension direction, wherein, from each row of P pixels present along the first dimension direction extracted by the pixel extraction section, the data sequence extraction section may extract data sequences each composed of R pixel values (where R is a natural number smaller than P), the respective data sequences being shifted by one pixel along the first dimension direction and containing different sets of R pixel values, wherein, for each data sequence, the distribution calculation section may input the R pixel values composing the data sequence to the predetermined Kurt function to calculate a kurtosis of the distribution profile, and wherein, based on the kurtoses of the distribution profiles calculated by the distribution calculation section, the patch position detection section may detect a center of the patch for each of the Q rows present along the second dimension direction. In this case, the pixel extraction section extracts pixels composing the patch and its surrounding periphery, based on the predetermined relative position of the patch with respect to the reference mark. Specifically, the pixel extraction section roughly selects P×Q pixels composing the patch and its surrounding periphery. Thereafter, the patch position detection section detects the patch position from the P×Q pixels extracted by the pixel extraction section. As a result, the patch position detection section can detect the patch center position fast and accurately.

R may be an odd number greater than M. Thus, the pixel extraction section extracts data sequences each composed of R pixel values, where R is an odd number greater than the first dimension of the patch. As a result, the patch position detection section can detect the patch center position with certainty.

The patch measurement device may be provided in a printing apparatus for printing a plurality of colors on the paper, and wherein the imaged data may be generated by imaging the control strip and the reference mark while the paper is being transported in a sheet form in the printing apparatus while being gripped at one end thereof. Thus, by employing the patch measurement device as an in-line component of a printing apparatus which is capable of multi-color printing, it is possible to measure the color density of the patch while the paper is being transported in a sheet form while being gripped at one end thereof.

A third aspect of the present invention is directed to a patch measurement method for measuring color density of a patch in a control strip printed on paper, the paper having a reference mark for facilitating positioning printed at a predetermined distance from the patch, wherein the patch measurement method comprises: a storage step of storing imaged data representing at least the control strip and the reference mark on the paper; a reference mark detection step of detecting the reference mark based on the imaged data stored by the storage step; a pixel extraction step of extracting, from the imaged data stored by the storage step, pixels composing the patch and surrounding pixels by referring to the reference mark detected by the reference mark detection step; a patch position detection step of detecting a position of the patch based on values of the pixel extracted by the pixel extraction step; and a color density measurement step of measuring color density of the patch based on the value of at least one pixel located at the position detected by the patch position detection step.

According to the above-described structure, the pixel extraction step extracts pixels composing the patch and its surrounding periphery, based on the predetermined relative position of the patch with respect to the reference mark. Specifically, the pixel extraction step roughly selects the patch and its surrounding pixels. Thereafter, the patch position detection step detects the patch position from the pixels extracted by the pixel extraction step. As a result, the patch position can be detected fast and accurately. Thus, a patch measurement device which is capable of accurate color density measurement can be provided.

The imaged data may comprise pixels representing the patch, and wherein the patch position detection step may comprise: a data sequence extraction step of extracting a predetermined number of data sequences from the pixels extracted by the pixel extraction step, each data sequence being composed of a predetermined number of pixel values encompassing a portion of the patch; and a distribution calculation step of calculating, for each data sequence extracted by the data sequence extraction step, a distribution profile of the pixel values composing the data sequence, wherein the patch position detection step may detect the position of the patch based on the distribution profiles calculated by the distribution calculation step.

The distribution calculation step may input the pixel values composing each data sequence to a predetermined function to calculate a kurtosis of the distribution profile, wherein the patch position detection step may detect a center of the patch based on the kurtoses calculated by the distribution calculation step, and wherein the color density measurement step may measure the color density of the patch based on the value of at least one pixel located at the center of the patch detected by the patch position detection step.

The predetermined function may be a Kurt function.

The patch printed on the paper may be rectangular-shaped; the imaged data may include M×N pixels (where M and N are natural numbers) representing the patch, along a first dimension direction and a second dimension, respectively, wherein the second dimension direction is perpendicular to the first dimension direction, wherein, from the imaged data stored by the storage step, the pixel extraction step may extract P×Q pixel values composing the patch and a surrounding periphery thereof by referring to the reference mark detected by the reference mark detection step, wherein P is the number of pixels present along the first dimension direction and Q is the number of pixels present along the second dimension direction, wherein, from each row of P pixels present along the first dimension direction extracted by the pixel extraction step, the data sequence extraction step may extract data sequences each composed of R pixel values (where R is a natural number smaller than P), the respective data sequences being shifted by one pixel along the first dimension direction and containing different sets of R pixel values, wherein, for each data sequence, the distribution calculation step may input the R pixel values composing the data sequence to the predetermined Kurt function to calculate the kurtosis of the distribution profile, and wherein, based on the kurtoses of the distribution profiles calculated by the distribution calculation step, the patch position detection step may detect a center of the patch for each of the Q rows present along the second dimension direction.

R may be an odd number greater than M.

The reference mark detection step may comprise: an image pattern extraction step of extracting from the imaged data an image pattern approximately corresponding to a predetermined reference pixel pattern of the reference mark, the image pattern being sequentially shifted by a predetermined number of pixels; a correlation coefficient calculation step of calculating a correlation coefficient by subtracting, from a sum of multiplication products of corresponding elements of the reference pixel pattern and the image pattern, a sum of multiplication products of corresponding elements of an inverted pixel pattern of the reference pixel pattern and the image pattern; and a reference mark position detection step of detecting a maximum value among a number of said correlation coefficients calculated by the correlation coefficient calculation step, and determining the position of the pixel associated with the maximum value as the position of the reference mark on the paper.

The calculation of the correlation coefficient by the correlation coefficient calculation step may comprise dividing the reference pixel pattern and the inverted pixel pattern, each by a weighting factor representative of a pattern shape of the respective pattern.

The imaged data stored by the storage step may be generated for each of RGB colors, and wherein the correlation coefficient calculation step may calculate the correlation coefficient for imaged data of each of RGB colors, in accordance with the color of the reference mark.

The imaged data may be generated by imaging the control strip and the reference mark while the paper is being transported in a sheet form while being gripped at one end thereof.

A fourth aspect of the present invention is directed to a patch measurement method for measuring color density of a patch in a control strip printed on paper, wherein the patch measurement method comprises: a storage step of storing imaged data representing the control strip on the paper; a patch position detection step of detecting a position of the patch based on the values of pixels composing the imaged data stored by the storage step; and a color density measurement step of measuring color density of the patch whose position is detected by the patch position detection step.

The imaged data may comprise pixels representing the patch, and wherein the patch position detection step may comprise: a data sequence extraction step of extracting a predetermined number of data sequences from the imaged data stored by the storage step, each data sequence being composed of a predetermined number of pixel values encompassing a portion of the patch and a surrounding periphery thereof; and a distribution calculation step of calculating, for each data sequence extracted by the data sequence extraction step, a distribution profile of the pixel values composing the data sequence, wherein the patch position detection step may detect the position of the patch based on the distribution profiles calculated by the distribution calculation step.

The distribution calculation step may input the pixel values composing each data sequence to a predetermined function to calculate a kurtosis of the distribution profile, wherein the patch position detection step may detect a center of the patch based on the kurtoses calculated by the distribution calculation step, and wherein the color density measurement step may measure the color density of the patch based on the value of at least one pixel located at the center of the patch detected by the patch position detection step.

Thus, in accordance with the fourth aspect, the patch position detection step can directly derive a patch position from the pixels composing the imaged data, as opposed to the conventional technique of identifying a patch position based solely on the relative position of a patch with respect to reference mark. Thus, the patch position can be accurately detected. As a result, accurate color density measurement can be provided.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
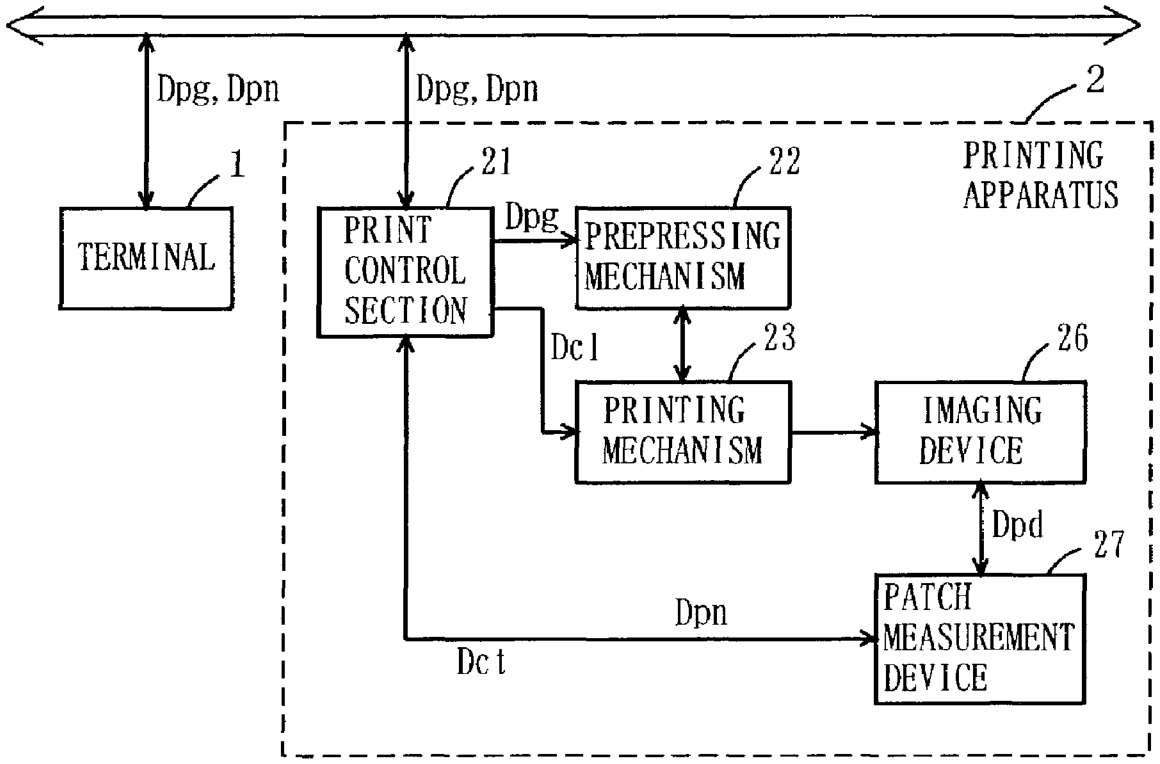
FIG. 1 is a functional block diagram illustrating the structure of a printing system incorporating a patch measurement device 27 according to a first or second embodiment of the present invention.

FIG. 1 is a functional block diagram illustrating the structure of a printing system incorporating a patch measurement device 27 according to a first embodiment of the present invention. Via a network, a terminal 1 and a printing apparatus 2 are coupled to the printing system shown in FIG. 1 so as to be capable of communicating with each another.

The terminal 1, which lies external to the printing apparatus 2, is a computer system comprising a CPU, a main storage device, a display device, an input device, and an auxiliary storage device. By operating the terminal 1, an operator edits or generates data based on which an image is formed on a printing plate (hereinafter referred to as "image-to-print data Dpg"), and transmits the image-to-print data Dpg to the printing apparatus 2. As already described with reference to FIGS. 16A and 16B, the image-to-print data Dpg represents an image im (as a main subject of printing by the printing apparatus 2), four control strips cs1 to cs4, and three reference marks rm1 to rm3. Hereinafter, the four control strips cs1 to cs4 may collectively be referred to as "control strips cs", and the three reference marks rm1 to rm3 as "reference marks rm".

The printing apparatus 2 produces a printing plate based on the image-to-print data Dpg received from the terminal 1. The printing apparatus 2 transfers the ink which has been supplied to the produced printing plate onto a printing paper, gradually proceeding in a direction of print progress indicated by an arrow in FIGS. 16A and 16B (hereinafter referred to as a "first printing direction"). Thus, the printing apparatus 2 prints the image im shown in FIG. 16A, followed by the four control strips cs1 to cs4 and the three reference marks rm1 to rm3.

The image im is printed on the printing paper, beginning at a position (hereinafter referred to as a "print start position") which is located a predetermined gripper margin f away from the leading end of the printing paper. More specifically, the image im is progressively printed in the first printing direction, beginning from the print start position. The image im has a dimension m along the first printing direction, which is to be designated according to the image size. The control strips cs and the reference marks rm are printed beginning at a position which is a predetermined distance n away from the trailing end of the image im. Therefore, the positions of the control strips cs and the reference marks rm on the printed material S along the first printing direction can be easily determined.

Figure 16A:
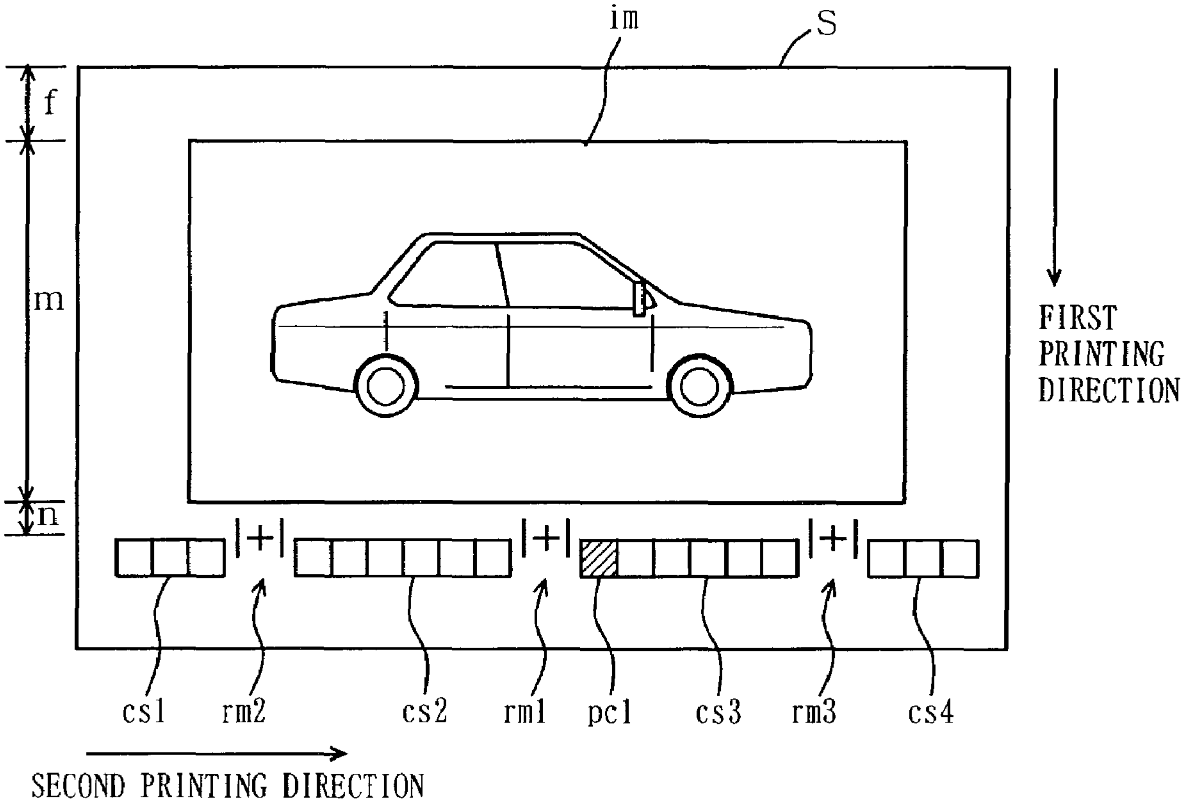
FIG. 16A is a diagram illustrating control strips cs and reference marks rm on a printed material S.
Figure 16B:
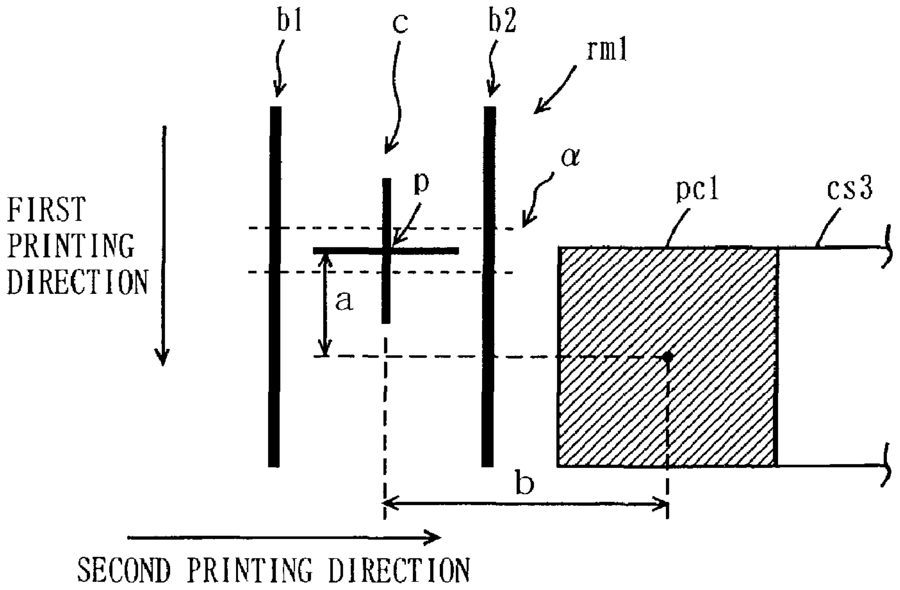
FIG. 16B is an enlarged view of the control strips cs and reference marks rm shown in FIG. 16A.

As shown in FIG. 16A, the control strips cs are typically printed side by side on the printing material S with predetermined intervals therebetween along a direction (hereinafter referred to as a "second printing direction") perpendicular to the first printing direction, and each control strip cs includes a plurality of rectangular-shaped patches arranged in a predetermined order. Each patch may be a half-tone, linework, or solid image which is printed with a predetermined density in a predetermined color. FIG. 16B illustrates an exemplary patch pc1.

As shown in FIG. 16A, the reference mark rm1 is interposed between two adjoining control strips cs2 and cs3. The reference mark rm2 is interposed between the control strips cs1 and cs2, and the reference mark rm3 is interposed between the control strips cs3 and cs4. As such, the reference marks rm1 to rm3 serve as references based on which to detect the positions of the control strips cs1 to cs4. Typically, as exemplified by the reference mark rm 1 shown in FIG. 16B, a reference mark comprises two bars b1 and b2 which run parallel to the first printing direction, and a cross mark c interposed between the bars b1 and b2. Each patch is printed at a position which is predetermined distances away—along the first and second printing directions—from a crosspoint p of the cross mark c. For example, the patch pc1 is printed so that the center thereof is at a distance a (along the first printing direction) and at a distance b (along the second printing direction) from the crosspoint p of the reference mark rm1. The image-to-print data Dpg is generated in such a manner that the control strip cs1 and cs4 are positioned in a point-symmetrical relationship around the crosspoint p of the reference mark rm1, and that the control strips cs2 and cs3 are positioned in a similar point-symmetrical relationship.

On the other hand, each reference mark rm, which is printed in a single color of B (black), is a mark used for positioning purposes. On the immediately upper side of where the control strips cs are printed (closer to where the image im is printed) is a predetermined blank region which is purposely left white, i.e., no images are printed. It is ensured that the bars b1 and b2 are longer than the width (along the first printing direction) of the region in which the control strips cs are printed, and long enough to encompass part of the blank region. Accordingly, the positions of the control strips cs and the reference marks rm on the printed material S can be easily determined in accordance with the predetermined distance n from the trailing end of the image im. Based on the determined positions, any region in which a detectable portion of the bars b1 and b2 appears along the first printing direction can be determined as part of the region in which the control strips cs are printed, and/or part of the blank region.

Figure 2:
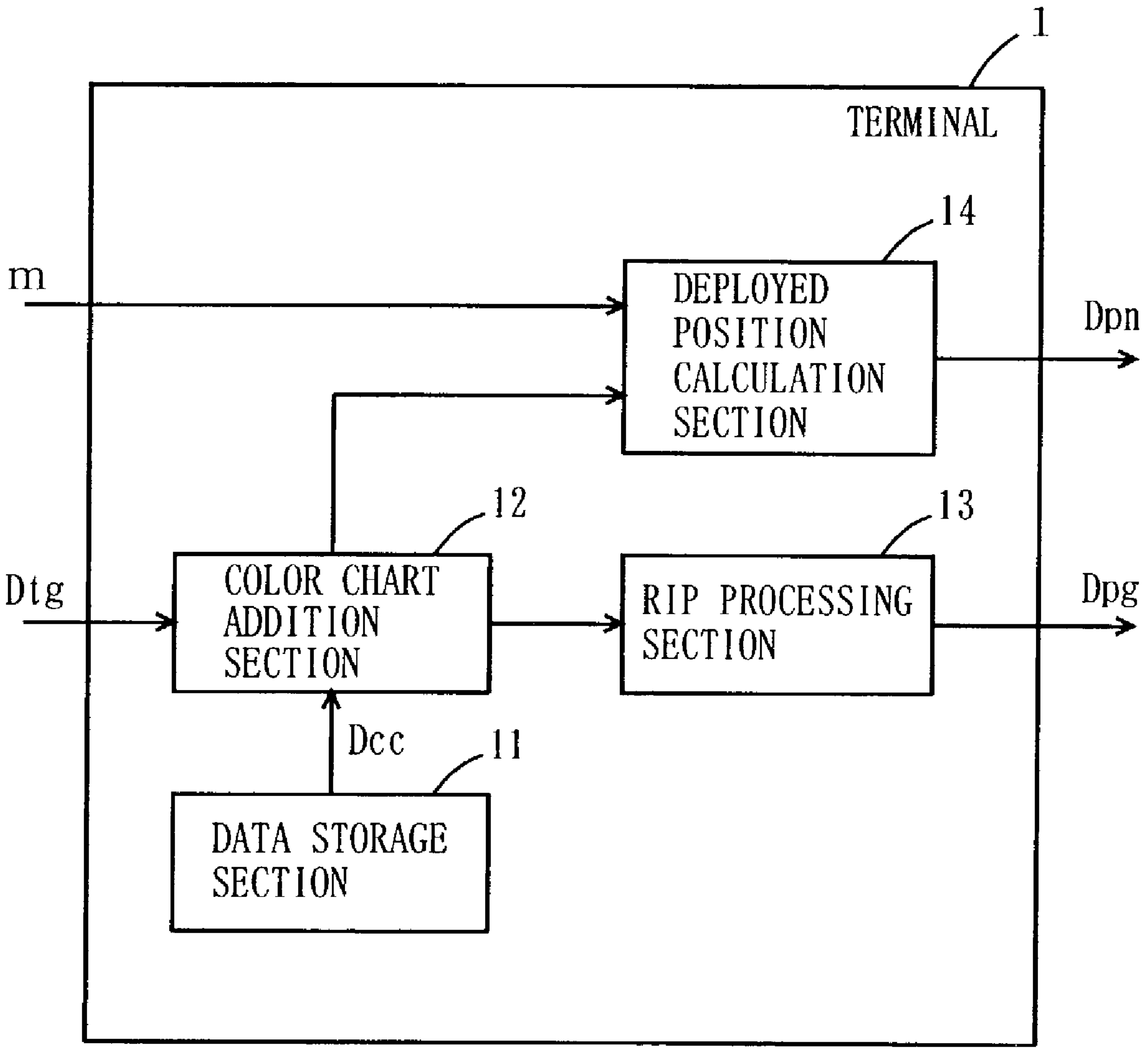
FIG. 2 is a functional block diagram illustrating the detailed structure of a terminal 1 shown in FIG. 1.

Hereinafter, the details of the terminal 1 for producing the aforementioned image-to-print data Dpg will be described with reference to FIG. 2. FIG. 2 is a functional block diagram illustrating the detailed structure of the terminal 1 shown in FIG. 1. As shown in FIG. 2, the terminal 1 comprises a data storage section 11, a color chart addition section 12, an RIP processing section 13, and a deployed position calculation section 14. The data storage section 11 previously stores color chart data Dcc representing the reference marks rm and control strips cs. Subject image data Dtg representing the image im to be printed is externally supplied to the color chart addition section 12. As described above, the subject image data Dtg is generated or edited by the terminal 1. The color chart addition section 12 adds the color chart data Dcc (which is stored in the data storage section 11) to the received subject image data Dtg. The RIP processing section 13 performs an RIP-process (Raster-Image-Processing) for the subject image data Dtg to which the color chart data Dcc has been added, thereby generating the aforementioned image-to-print data Dpg in the form of binary data. The RIP processing section 13 transmits the generated image-to-print data Dpg to a print control section 21 in the printing apparatus 2 via the network.

According to the first embodiment, the color chart addition section 12 automatically performs the aforementioned processes in accordance with a predetermined deployment condition, e.g., "add control strips cs and reference marks rm at a position following the image im to be printed". Alternatively, an operator may manually determine how the control strips cs and the like are deployed.

The deployed position calculation section 14 calculates the positions of the control strips cs and the reference marks rm. For example, if the predetermined deployment condition used in the color chart addition section 12 is "add control strips cs and reference marks rm at a position following the image im to be printed", the deployed position calculation section 14 can calculate the position of the control strips cs and the reference marks rm on the printing paper by adding the predetermined gripper margin f and the dimension m of the image im (see FIG. 16A). Herein, the terminal 1 may derive the dimension m of the image im directly from the aforementioned subject image data Dtg, or the dimension m may be obtained from an external image data generation device (not shown) which actually generated the subject image data Dtg. Via the network, the deployed position calculation section 14 transmits the thus-calculated deployed position to the print control section 21 in the printing apparatus 2 as deployed position information Dpn. In the case where an operator deploys the control strips cs and the reference marks rm at arbitrary positions, the deployed position calculation section 14 may calculate the deployed position based on the relative positions of the control strips cs and the reference marks rm with respect to the image im represented by the subject image data Dtg.

Referring back to FIG. 1, the printing apparatus 2 comprises: the print control section 21, a prepressing mechanism 22, a printing mechanism 23, an imaging device 26, and the patch measurement device 27. The print control section 21, which is a computer system realized by means of a CPU and like elements mounted on a substrate, controls the prepressing mechanism 22 and the printing mechanism 23 via various interfaces. In a typical process, the print control section 21 receives image-to-print data Dpg from the terminal 1 via the network, and sends the received image-to-print data Dpg to the prepressing mechanism 22. In another typical process, the print control section 21 receives the deployed position information Dpn from the terminal 1 via the network and sends the deployed position information Dpn to the patch measurement device 27. Furthermore, based on color density information Dct (described later) provided from the patch measurement device 27, the print control section 21 generates deployed position information Dpn, which is used for adjusting the supply amounts of ink and/or dampening water used in the printing mechanism 23 (described later).

Figure 3:
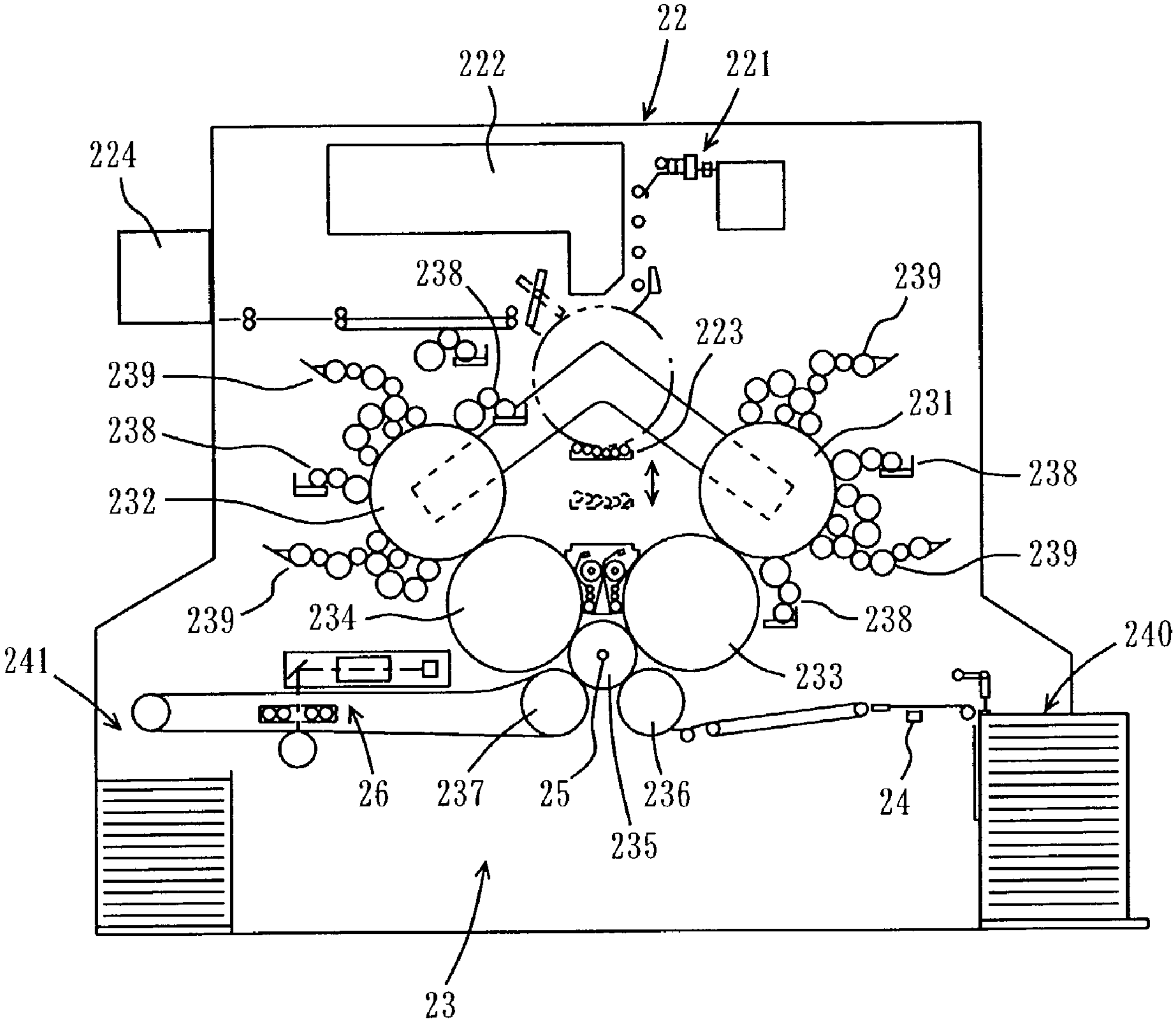
FIG. 3 is a schematic side view illustrating a prepressing mechanism 22 and a printing mechanism 23 shown in FIG. 1.

Based on the image-to-print data Dpg sent from the print control section 21, the prepressing mechanism 22 forms an image on a printing plate. By employing a printing plate which is formed by the prepressing mechanism 22 or obtained from another source, the printing mechanism 23 transfers an ink image onto printing paper. Hereinafter, detailed structures of the prepressing mechanism 22 and the printing mechanism 23 will be described with reference to FIG. 3. FIG. 3 is a schematic side view illustrating the prepressing mechanism 22 and the printing mechanism 23 shown in FIG. 1. Referring to FIG. 3, the prepressing mechanism 22, which performs a prepress process, comprises a printing plate supply section 221, an image recording section 222, a development section 223, and a printing plate discharging section 224. The printing plate supply section 221 includes a supply cassette, transportation rollers, a transportation guide, and a cutter, although not shown in detail. The supply cassette accommodates an unexposed printing plate, which is rolled up for storage in a state shielded from light. A silver plate may be used for the printing plate, for example. The transportation rollers and the transportation guide pull out the unexposed printing plate accommodated in the supply cassette, and transports the unexposed printing plate to the plate drums 231 and 232. The cutter cuts the printing plate which is transported by the transportation rollers into separate sheets. Each sheet of unexposed printing plate is retained by the plate drums 231 and 232 (described in detail later).

Although not shown in detail, the image recording section 222 includes a laser, and a deflector such as a polygon mirror. The image recording section 222 modulates a laser light beam in accordance with the image-to-print data Dpg supplied to the prepressing mechanism 22 so as to subject the printing plate retained by the plate drums 231 and 232 to exposure, whereby the image im, all control strips cs and all reference marks rm as shown in FIG. 16A are recorded on the printing plate. The laser is driven in accordance with the image-to-print data Dpg so as to emit a laser light beam which is modulated in accordance with the image-to-print data Dpg. The deflector deflects the laser light beam emitted from the laser, whereby a horizontal scanning with the laser light beam occurs along the axial direction of the plate drum 231 or 232. Furthermore, a vertical scanning with the deflected laser light beam also occurs along the respective direction of rotation as the plate drum 231 or 232 rotates during the horizontal scanning. Alternatively, the scanning may be achieved by employing a plurality of lasers provided side by side along the axial direction of the plate drums 231 and 232, and performing a horizontal scanning with the rotations of the plate drums 231 and 232. Instead of employing an exposure technique, the image recording section 222 may record the image im, all control strips cs, and all reference marks rm by heating or electrical discharge technique.

The development section 223 performs a development process for the printing plate which has been subjected to exposure by the image recording section 222. Although not shown in detail, the development section 223 includes a processing bath, an application roller, and a moving mechanism. The processing bath stores a processing agent which is necessary for the development of the printing plate. The application roller takes up the processing agent from the processing bath and applies it to the printing plate retained by the plate drum 231 or 232, whereby the printing plate undergoes a development process. Immediately before the development of the printing plate occurs, the moving mechanism moves the application roller from a position retracted away from the plate drum 231 or 232 to a position neighboring them. After the development of the printing plate is completed, the application roller retracts the moving mechanism from the position neighboring the plate drum 231 or 232 to the retracted position. Thus, only during the development does the application roller approach the plate drum 231 or 232 to enable the processing agent to be applied on the printing plate. In the case where the image recording method employed in the image recording section 222 does not require a development process, the development section 223 may be omitted from the prepressing mechanism 22.

After the printing process by the printing mechanism 23 is completed, the printing plate discharging section 224 discharges the exposed printing plate, which is no longer of use. Although not shown in detail, the printing plate discharging section 224 includes a releasing section, transportation rollers, a transportation guide, and a discharge cassette. From the plate drums 231 and 232, the releasing section releases the printing plate on which an image has already been formed. The transportation rollers and transportation guide function to transport the printing plate which has been released from the plate drums 231 and 232 by the releasing section to the discharge cassette. The discharge cassette accommodates the printing plate which has been transported by the transportation rollers and the like.

Still referring to FIG. 3, the printing mechanism 23, which performs a printing process, comprises the plate drums 231 and 232, blanket drums 233 and 234, a impression cylinder 235, a feed drum 236, a discharge drum 237, dampening water supply units 238, ink supply units 239, a feed unit 240, and a discharge unit 241. The plate drums 231 and 232 each have a cylindrical shape, with the same diameter. A gripper unit (not shown) is provided on the cylindrical surface of each of the plate drums 231 and 232. Each gripper unit stabilizes two printing plates (corresponding to two colors) on the respective cylindrical surface, at opposing positions which are apart by 180°. By the action of a plate drum driving mechanism (not shown), the plate drum 231 moves between a first printing position (as illustrated in FIG. 3 with a solid line near the units 238 and 239 on the right-hand side) and an image recording position (as illustrated in FIG. 3 with a double-dash line). Similarly, by the action of a plate drum driving mechanism (not shown), the plate drum 232 moves between a second printing position (as illustrated in FIG. 3 with a solid line near the units 238 and 239 on the left-hand side) and the aforementioned image recording position. As described later in more detail, the plate drums 231 and 232 are alternately placed in the image recording position during a prepress process.

While the plate drum 231 or 232 is situated in the image recording position, the aforementioned printing plate which has been transported from the printing plate supply section 221 is set on the plate drum 231 or 232 in the following manner. A gripper unit (not shown) is provided on the cylindrical surface of the plate drum 231. In the image recording position, the gripper unit printing plate stabilizes two printing plates (corresponding to two colors), which has been transported from the supply section 221, at opposing positions which are apart by 180° on the cylindrical surface. Thereafter, the above-described prepress process is performed, whereby the image recording section 222 forms the image im, all control strips cs and all references mark rm (see FIG. 16A) on each printing plate retained by the plate drum 231. Then, a similar process is performed for the plate drum 232 as for the plate drum 231, whereby the image recording section 222 forms the image im, all control strips cs and all references mark rm on each of the printing plates corresponding to two colors retained by the plate drum 232. During a subsequent printing process, the plate drums 231 and 232 are placed in the first and second printing positions, as described later in detail.

The blanket drums 233 and 234 have substantially the same diameter as those of the plate drums 231 and 232. On the cylindrical surface of each of the blanket drums 233 and 234, a blanket is mounted, onto which two ink images (corresponding to two colors) obtained from the plate drums 231 and 232, respectively, are to be transferred. The blanket drum 233 is disposed so as to be capable of rotating in abutment with the plate drum 231 situated in the first printing position. The blanket drum 234 is disposed so as to be capable of rotating in abutment with the plate drum 232 situated in the second printing position.

The impression cylinder 235 has a diameter which is substantially ½ of those of the plate drums 231 and 232. A gripper unit (not shown) is provided on the cylindrical surface of the impression cylinder 235. The gripper unit is opened and closed by an open/close mechanism (not shown) with predetermined timing, so as to grip the leading end of a printing paper sheet having a size corresponding to the printing plate of each color (see FIG. 16A). The impression cylinder 235 is disposed so as to be capable of rotating in abutment with both of the blanket drums 233 and 234. An encoder 25 is provided on the rotation axis of the impression cylinder 235. The encoder 25 is generally employed to detect the rotary position of the impression cylinder 235. According to the first embodiment, in particular, the encoder 25 detects the transported position of the printing paper as retained by the impression cylinder 235.

The feed drum 236, which has substantially the same diameter as the impression cylinder 235, is disposed so as to be capable of rotating in abutment with the impression cylinder 235. A gripper unit (not shown) is affixed on the cylindrical surface of the feed drum 236, as on the cylindrical surface of the impression cylinder 235. The gripper unit functions in synchronization with the gripper unit on the impression cylinder 235 to grip one sheet of printing paper which is fed from the feed unit 240 (described later). Then, as the feed drum 236 rotates, the gripper unit transports one sheet of printing paper over to the gripper unit on the impression cylinder 235.

The discharge drum 237 has substantially the same shape and structure as the feed drum 236. A gripper unit (not shown) on the discharge drum 237 grips the printing paper which is transported from the impression cylinder 235, in a manner similar to the gripper unit on the feed drum 236, except that the gripper unit transports the printing paper over to the discharge unit 241 (described later) as the discharge drum 237 rotates.

On a side face of each of the plate drums 231 and 232 in the aforementioned first and second printing positions, respectively, the blanket drums 233 and 234, the impression cylinder 235, the feed drum 236, and the discharge drum 237, a driving gear (not shown) having the same diameter as the respective drum is attached, such that the driving gears disposed on any two abutting drums engage each other. A print driving motor (not shown) is provided in the printing apparatus 2 to drive the respective driving gears, whereby the aforementioned seven drums rotate in synchronization.

As described above, the plate drums 231 and 232 and the blanket drums 233 and 234 have a circumference which is twice as long as that of the impression cylinder 235. Therefore, the impression cylinder 235 makes two rotations while the plate drums 231 and 232 in the first and second printing positions and the blanket drums 233 and 234 make a single rotation. On the cylindrical surface of each of the plate drums 231 and 232, printing plates corresponding to two colors are stabilized at opposing positions which are apart by 180°. Accordingly, as the impression cylinder 235 makes two rotations while retaining printing paper thereon, the image im, the control strips cs, and the reference marks rm formed on the four printing plates (corresponding to four colors) retained by the plate drums 231 and 232 are transferred on the printing paper in superposition, thereby achieving four-color printing.

Two pairs of dampening water supply units 238 are provided in the printing mechanism 23, one pair being associated with each of the plate drums 231 and 232. Specifically, one pair of dampening water supply units 238 is disposed near the plate drum 231 in the first printing position for selectively supplying dampening water to the two printing plates (corresponding to two colors) retained by the plated rum 231. The other pair is disposed near the plate drum 232 in the second printing position for selectively supplying dampening water to the two printing plates (corresponding to two colors) on the plate drum 232. In order to realize the above function, each dampening water supply unit 238 comprises a water bin, dampening water rollers, and a cam mechanism, although not shown in detail. The water bin stores dampening water. The dampening water rollers take up dampening water from the water bin, and supply it to a corresponding printing plate retained by the plate drum 231 or 232. When supplying dampening water to the printing plate, the cam mechanism moves the dampening water roller abutting with the printing plate from the position retracted away from the plate drum 231 or 232 to a position neighboring them. Furthermore, after the supply of dampening water has been completed, the cam mechanism retracts the dampening water roller abutting with the printing plate from the position neighboring the plate drum 231 or 232 back to the retracted position. As mentioned earlier, the supply amount of dampening water is adjusted by the print control section 21. In the case where the printing plates used are of a type which does not require dampening water, the dampening water supply units 238 can be omitted.

Two pairs of ink supply units 239 are provided in the printing mechanism 23, one pair being associated with each of the plate drums 231 and 232. Specifically, one pair of ink supply units 239 is disposed near the plate drum 231 in the first printing position for selectively supplying ink to the two printing plates (corresponding to two colors) retained by the plate drum 231; for example, this pair of ink supply units 239 may respectively supply inks of B (black) and M (magenta) to the printing plates on the plate drum 231. The other pair is disposed near the plate drum 232 in the second printing position for selectively supplying ink to the two printing plates (corresponding to two colors) on the plate drum 232; for example, this other pair of ink supply units 239 may respectively supply inks of C (cyan) and Y (yellow) to the printing plates on the plate drum 231. In order to realize the above function, each ink supply unit 239 comprises an ink duct, a plurality of ink rollers, and a cam mechanism, although not shown in detail. The ink duct, which stores an ink of a predetermined color, supplies the ink in a number of regions on the printing plate along the second printing direction, by way of a plurality of ink rollers. As mentioned earlier, the supply amount of the ink is adjusted by the print control section 21. The ink rollers knead the ink supplied from the ink duct and supplies it to the printing plate. When supplying ink to the printing plate, the cam mechanism moves the ink rollers abutting with the printing plate from the position retracted away from the plate drum 231 or 232 to a position neighboring them. Furthermore, after the supply of ink has been completed, the cam mechanism retracts the ink rollers abutting with the printing plate from the position neighboring the plate drum 231 or 232 back to the retracted position.

Note that some of the dampening water supply units 238 are arranged so as to be capable of escaping the moving paths of the plate drums 231 and 232, in order to allow the plate drums 231 and 232 to move from the first and second printing positions, respectively, to the image recording position. The same is also true of some of the ink supply units 239.

The feed unit 240 takes out each sheet of printing paper from a pile of unused printing paper, and passes it to the feed drum 236. Since printing for one sheet of printing paper occurs with every two rotations of the impression cylinder 235 (as described above), the feed unit 240 passes one sheet of printing paper to the feed drum 236 with every two rotations of the feed drum 236 according to the first embodiment. The feed unit 240 includes a printing paper sensor 24 for optically detecting the passage of printing paper. The printing paper sensor 24 is generally employed to detect stuck paper or accidental taking of two sheets of paper. According to the first embodiment, based on the result of detection by the printing paper sensor 24, the feed unit 240 can determine whether printing paper is being supplied to the impression cylinder 235 or the feed drum 236, or no printing paper is being supplied to the impression cylinder 235 or the feed drum 236.

Figure 4:
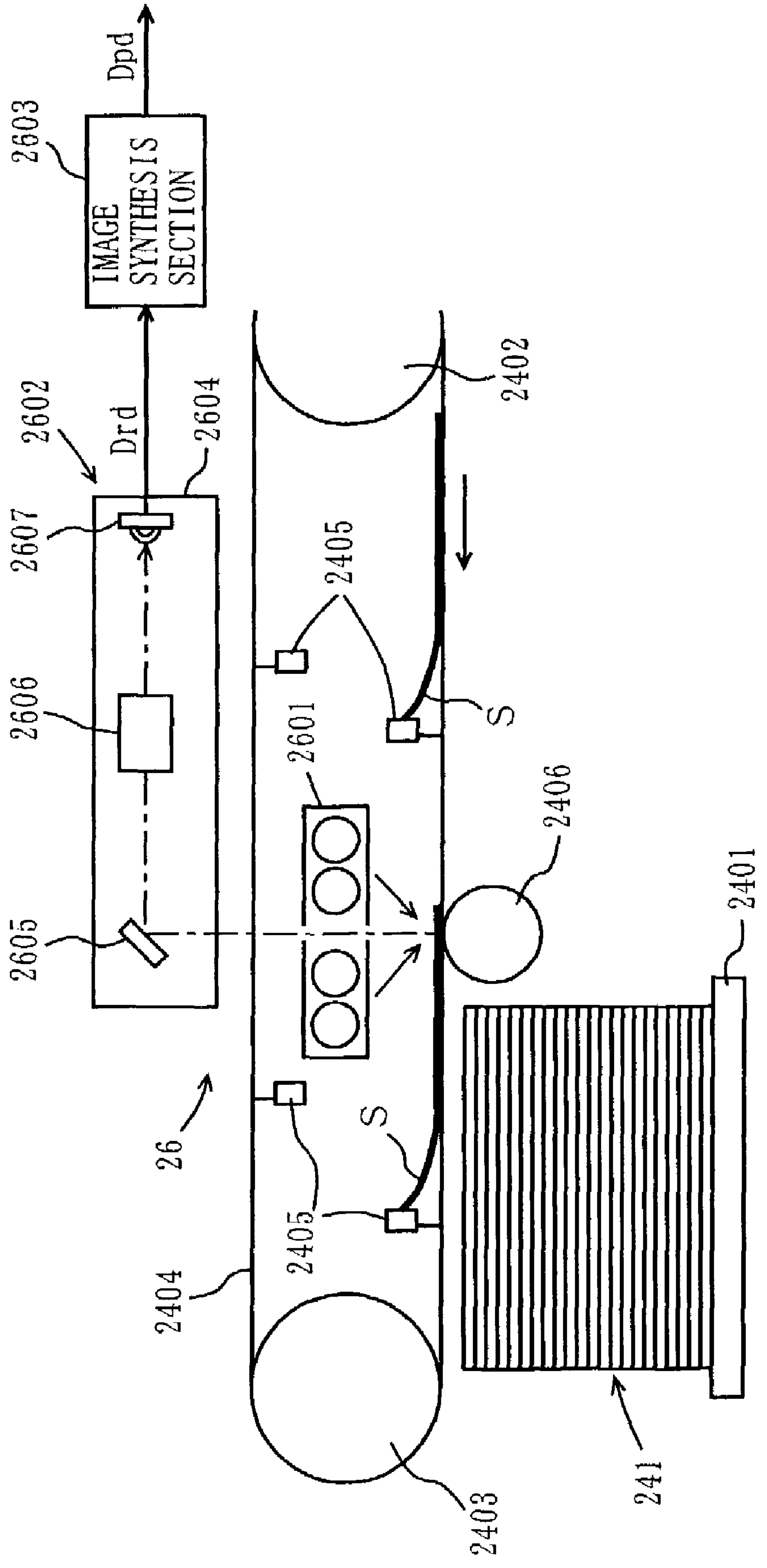
FIG. 4 is a schematic side view illustrating the detailed structures of a discharge unit 241 shown in FIG. 3 and an imaging device 26 according to the first embodiment of the present invention.

The discharge unit 241 receives the printing paper which has undergone printing (hereinafter referred to as a "printed material S") from the discharge drum 237, and piles the printed materials S in itself. Hereinafter, the details of the discharge unit 241 as well as the imaging device 26 will be described with reference to FIG. 4. FIG. 4 is a schematic side view illustrating the detailed structures of the discharge unit 241 shown in FIG. 3 and the imaging device 26 according to the first embodiment of the present invention. The discharge unit 241 comprises a discharge base 2401, two pairs of gears 2402 and 2403, two endless chains 2404, and a plurality of gripper units 2405. Note that FIG. 4 only shows one of the gears 2402, one of the gears 2403, and one of the chains 2404 due to its nature as a side view. The discharge base 2401 is a palette-like member on which a number of printed materials S can be piled up. The discharge base 2401 is moved in up and down directions by an elevation mechanism (not shown). Specifically, the discharge base 2401 is gradually lowered as more printed materials S are piled up. Since this allows the topmost printed material S in the pile to be maintained at a substantially constant height, the discharging of printed materials S can be made smooth. The two gears 2402 are respectively affixed on the opposing side faces of the discharge drum 237, so as to have the same rotation axis as the discharge drum 237. The gears 2403 have a common rotation axis, which is in parallel to the rotation axis of the discharge drum 237 and extends above the discharge base 2401. Each chain 2404 has a length equal to an integer multiple of the circumference of the discharge drum 237, and is wound around one of the gears 2402 and one of the gears 2403 that are provided on the same side.

The gripper unit 2405 is fixed astride the two chains 2404. On the chain 2404, any two consecutive gripper units 2404 are provided at a fixed distance which is substantially equal to the circumference of the discharge drum 237. Each gripper unit 2404 has claws which are opened or closed to grip a printed material S. The claws are arranged so as to open or close in synchronization with the gripper unit (not shown) on the discharge drum 237 by a cam mechanism (not shown), and receive the printed material S which is transported from the discharge drum 7. The rotations of the two pairs of gears 2402 and 2403 drive the chains 2404 from the discharge drum 237 toward the discharge base 2401. Through this action, each gripper unit 2405 transports a printed material S, and as the claws open above the discharge base 2401, allows the printed material S to be piled on the discharge base 2401.

Since each gripper unit 2405 in the discharge unit 241 only grips one end of the printed material S, each printed material S is transported without its trailing end being fixed, which might allow a recoil of the printed material S to occur. Therefore, according to the present embodiment, in order to minimize the recoil of the printed material S, a suction roller 2406 for controlling the transportation of the printed material S is provided between the discharge drum 237 and the discharge base 2401. A large number of minute suction apertures are provided on the outer surface of the suction roller 2406, which are connected to a vacuum pump (not shown). The suction roller 2406 is disposed in such a manner that its axis extends in parallel to each gripper unit 2405 bridging the two chains 2404, and that the upper end of the suction roller 2406 is positioned at substantially the same height as the lower ends of the chains 2404. The suction roller 2406 is arranged so as to be driven to rotate in accordance with the travelling speed of the gripper unit 2404, or simply capable of freely rotating. Thus, when travelling over the suction roller 2406, each printed material S moves while being sucked onto the surface of the suction roller 2406. As a result, the printed material S is prevented from recoiling at least when travelling over the suction roller 2406. Instead of the suction roller 2406, a suction plate may be employed which sucks the printed material S onto a planar surface.

The imaging device 26 comprises a lighting unit 2601, two imaging units 2602, and an image synthesis section 2603. Note that, due to its nature as a side view, FIG. 4 only shows one of the two imaging devices 2602, which are disposed along a direction perpendicular to the plane of the drawing. The lighting unit 2601 illuminates each printed material S which is transported by the action of the chains 2404. More specifically, the lighting unit 2601 is disposed above the suction roller 2406 and between the chains 2404. The lighting unit 2601 comprises a plurality of linear light sources for illuminating a printed material S which is situated on the suction roller 2406. A slit is formed in the central portion of each linear light source, such that the reflected light from the printed material S (which originates from the linear light source) passes through the slit to enable image capturing.

Each imaging unit 2602 captures an image of the illuminated printed material S through the slit in the lighting unit 2601, thereby generating printed-image data Dpd (hereinafter also referred to as "imaged data") representing the image im, the control strips cs, and the reference marks rm (see FIGS. 16A and 16B). Throughout the present specification, image capturing in this sense may also be simply referred to as "imaging". In order to realize the above function, the imaging unit 2602 comprises a housing 2604 for light-shielding and dust prevention purposes, a mirror 2605, a lens 2606, and a CCD line sensor 2607. The mirror 2605, the lens 2606, and the CCD line sensor 2607 are accommodated within the housing 2604. The mirror 2605 reflects the light which has passed through the slit toward the lens 2606. The reflected light from the mirror 2605 is converged by the lens 2606 so as to be received by the CD line sensor 2607. The CCD line sensor 2607 reads images with respect to the three colors of RGB (i.e., red, green, and blue). According to the first embodiment, as the printed material S is transported, the printed material S is sequentially read in a line-by-line manner. Thus, by the time the entire (i.e., from the leading end to the trailing end of) printed material S has passed immediately under the lighting unit 2601, the CCD line sensor 2607 will have produced read-out image data Drd, from which printed-image data Dpd corresponding to one printed material S is generated.

Figure 5:
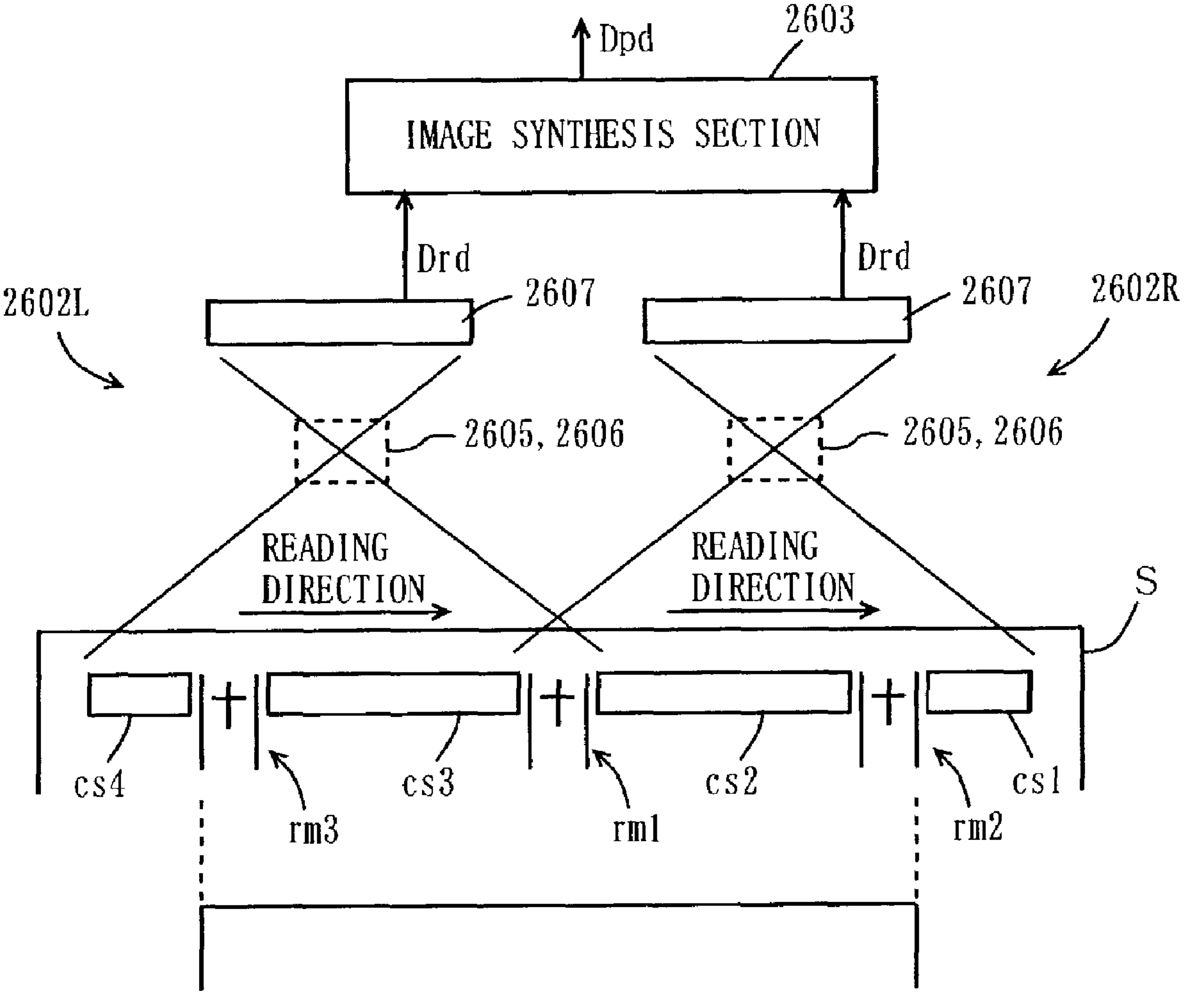
FIG. 5 is a diagram for specifically describing two imaging units 2602 shown in FIG. 4.

In the first embodiment, the two imaging units 2602 are disposed along a direction perpendicular to the plane of the drawing of FIG. 4, as mentioned above. The imaging units 2602 capture images of two split portions of the printed material S to generate respective read-out image data Drd, the division being made along the second printing direction. FIG. 5 is a diagram for specifically describing the two imaging units 2602 shown in FIG. 4. For conciseness, the imaging unit appearing on the left-hand side of FIG. 4 will hereinafter be referred to as the "imaging unit 2602L" and the other imaging unit as the "imaging unit 2602R". As described above, the imaging regions of the imaging unit 2602L and the 2602R generally correspond to the left-side portion and the right-side portion of the printed material S, respectively. Both imaging regions are arranged so as to overlap preferably in the neighborhood of a center line (extending parallel to the first printing direction of the printed material S). Moreover, the printing apparatus 2 is arranged so as to print the reference marks rm1 to rm3 at positions which will be safely within a printed material S having a marginal (i.e., minimum usable) width. The image-to-print data Dpg is generated in such a manner that the reference mark rm1 will be positioned in the aforementioned overlapping region.

On the other hand, the reference marks rm2 and rm3 are printed near the left and right ends of the printed material S, so that the reference marks rm1 and rm2 will be imaged by the imaging unit 2602L and that the reference marks rm1 and rm3 will be imaged by the imaging unit 2602R. Thus, each of the imaging units 2602L and 2602R images two reference marks rm. Based on such detection of the positions of the reference marks rm1 to rm3, it is possible to know the approximate positions of the control strips cs1 to cs4 because they are supposed to be printed at predetermined positions relative to the detected reference marks rm1 to rm3. In order to be able to image a single printed material S by means of the imaging units 2602L and 2602R, the respective CCD line sensors 2607 in the imaging units 2602L and 2602R are oriented so that their reading directions coincide.

The image synthesis section 2603 receives the read-out image data Drd from the two imaging units 2602, and through position matching based on the reference mark rm1, synthesizes the read-out image data Drd which have been read by the imaging units 2602L and 2602R to generate printed-image data Dpd representing a single printed material S. Furthermore, the image synthesis section 2603 sends the generated printed-image data Dpd to the patch measurement device 27.

Figure 6:
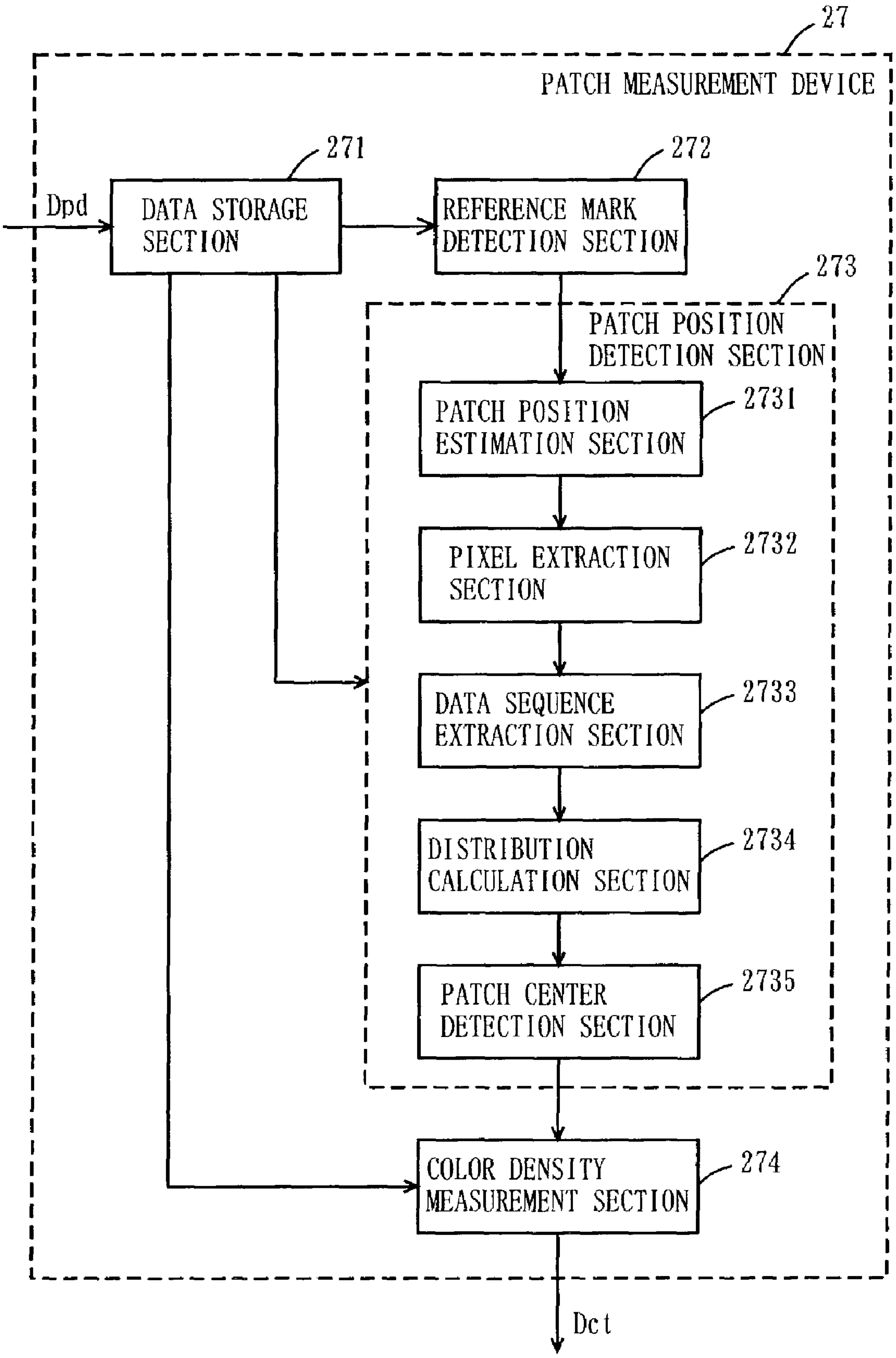
FIG. 6 is a functional block diagram illustrating the detailed structure of the patch measurement device 27 shown in FIG. 1.

The patch measurement device 27 (FIG. 1) measures the color density of the patches composing each control strip cs printed on the printing paper. FIG. 6 is a functional block diagram illustrating the detailed structure of the patch measurement device 27. Referring to FIG. 6, the patch measurement section 27 comprises a data storage section 271, a reference mark detection section 272, a patch position detection section 273, and a color density measurement section 274. The data storage section 271 stores printed-image data Dpd which is sent from the image synthesis section 2603. Based on the deployed position information Dpn from the print control section 21, the reference mark detection section 272 roughly identifies a region containing the control strips cs and reference marks rm in the printed-image data Dpd stored in the data storage section 271. By performing image processing for printed-image data Dpd corresponding to the identified region, the position of the crosspoint p of the reference mark rm (see FIGS. 16A and 16B) is detected.

The patch position detection section 273 comprises a patch position estimation section 2731, a pixel extraction section 2732, a data sequence extraction section 2733, a distribution calculation section 2734, and a patch center detection section 2735. Based on the position of the crosspoint p detected by the reference mark detection section 272, the patch position estimation section 2731 estimates the relative positions of the patches composing each control strip cs. Based on the relative positions estimated by the patch position estimation section 2731, the pixel extraction section 2732 extracts an estimated patch and its peripheral pixels from the printed-image data Dpd stored in the data storage section 271. From the pixels extracted by the pixel extraction section 2732, the data sequence extraction section 2733 further extracts a certain number of data sequences, each consisting of a predetermined number of pixel values. For each data sequence extracted by the data sequence extraction section 2733, the distribution calculation section 2734 calculates a distribution profile of pixel values composing that data sequence. Based on the distribution profile calculated by the distribution calculation section 2734, the patch center detection section 2735 detects the center position of the estimated patch extracted by the pixel extraction section 2732. In the present embodiment, as described above, relative positions of patches are detected based on the position of the reference mark rm, and thereafter the accurate center position of one of the patches is determined based on the pixels at the detected relative positions.

Furthermore, the color density measurement section 274 retrieves the pixels located at the center of the patch detected by the patch center detection section 2735 from the data storage section 271, and measures the color density information Dct (e.g., density and/or dot percentage) of the printed patch. Moreover, the color density measurement section 274 sends the measured color density information Dct to the print control section 21. Based on the color density information Dct from the patch measurement device 27, as described above, the print control section 21 generates and outputs control information Dc1, in accordance with which to adjust the supply amounts of ink and/or dampening water used in the aforementioned printing mechanism 23. Thus, the amount of ink supplied from the ink supply unit 239 and/or the amount of dampening water supplied from the dampening water supply unit 238 are automatically controlled.

Figure 7:
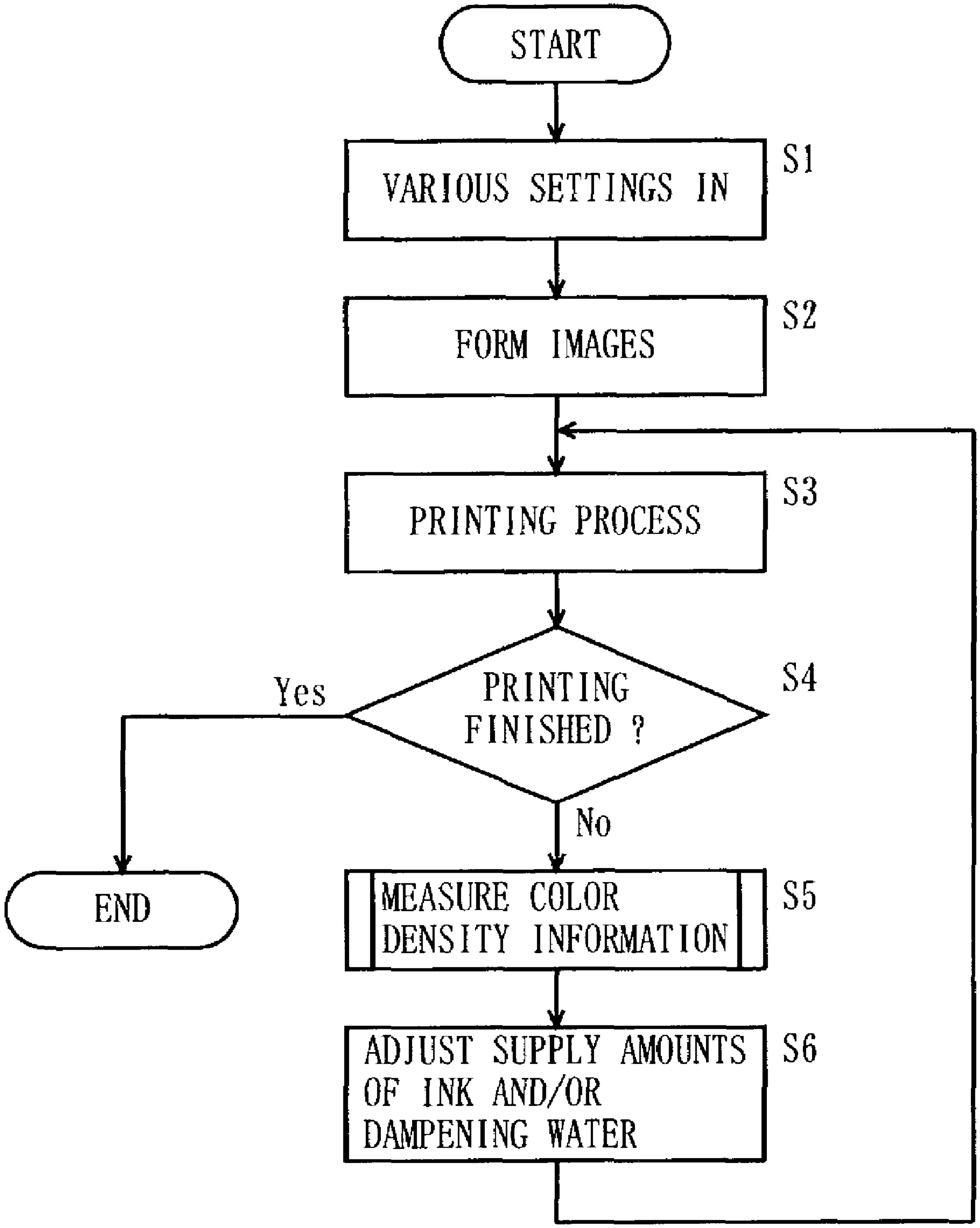
FIG. 7 is a flowchart illustrating a flow of control by the printing system shown in FIG. 1 up to the completion of a printing process.

Next, the overall operation of the printing system shown in FIG. 1 will be described with reference to FIG. 7. FIG. 7 is a flowchart illustrating a flow of control by the printing system up to the completion of a printing process.

The operator operates the terminal 1 to make various settings in the printing apparatus 2 (step S1). Typically, image-to-print data Dpg to be currently used and the number of printed materials S to be produced are set at step S1. Furthermore, not only the image-to-print data Dpg but also the aforementioned deployed position information Dpn are transmitted from the terminal 1 to the print control section 21 in the printing apparatus 2. Alternatively, the transmission of the image-to-print data Dpg may be performed in real time, i.e., in pace with the image formation on printing plates.

Next, the printing apparatus 2 forms an image im, control strips cs and reference marks rm represented by the currently received image-to-print data Dpg on printing plates (step S2). At step S2, either the plate drum 231 or 232 is moved to the image recording position, and an unexposed printing plate which has been transported from the printing plate supply section 221 is mounted on the plate drum 231 or 232 at the image recording position. Thereafter, the image recording section 222, an image exposure is performed on the printing plate mounted on the rotating plate drum 231 or 232 by using a laser light beam which is modulated in accordance with the image-to-print data Dpg received from the print control section 21. In other words, the image im, the control strips cs and the reference marks rm are formed on the printing plates. After the exposure is completed, the development section 223 performs a development process for the exposed printing plates in the aforementioned manner. After the development process is completed, the plate drum 231 or 232 which is currently in the image recording position is retracted to the first or second printing position. Thereafter, the plate drum 232 or 231 currently situated in the second or first printing position is moved to the image recording position, and exposure and development processes are performed for the printing plates mounted on the plate drum 232 or 231 in a manner similar to that described above. Thus, the prepress process is completed.

Next, the printing apparatus 2 performs a printing process using the printing plates which have been prepressed at step S2 (step S3). More specifically, the dampening water supply unit 238 supplies predetermined amounts of dampening water to the respective printing plates on the plate drums 231 and 232, and then the ink supply unit 239 supplies predetermined amounts of inks of corresponding colors to the printing plates. The ink images on the respective printing plates are transferred onto the blanket drums 233 and 234. On the other hand, the feed unit 240 supplies one sheet of printing paper to the feed drum 236 with the aforementioned timing. The supplied printing paper is passed from the feed drum 236 to the impression cylinder 235. While the impression cylinder 235 retaining the printing paper makes two rotations, ink images having been transferred onto the blanket drums 233 and 234 are transferred onto the printing paper. Thereafter, the printing paper is passed from the impression cylinder 235 to the discharge drum 237, and piled as a completed printed material S on the discharge base 2401 in the discharge unit 241.

Next, the printing apparatus 2 determines whether or not the number of printed materials S produced has reached the number which was set at step S1 (step S4). If the predetermined number has been reached, the process shown in FIG. 7 is completed. If the predetermined number has not been reached, the printing apparatus 2 measures color density information in the patch measurement device 27, for a predetermined number of sampled sheets (step S5). At step S5, the aforementioned color density information Dct is generated, and sent to the print control section 21. Next, based on the color density information Dct sent from the patch measurement device 27, the print control section 21 adjusts the supply amounts of ink and/or dampening water as described above (step S6), and the control returns to step S3.

Figure 8:
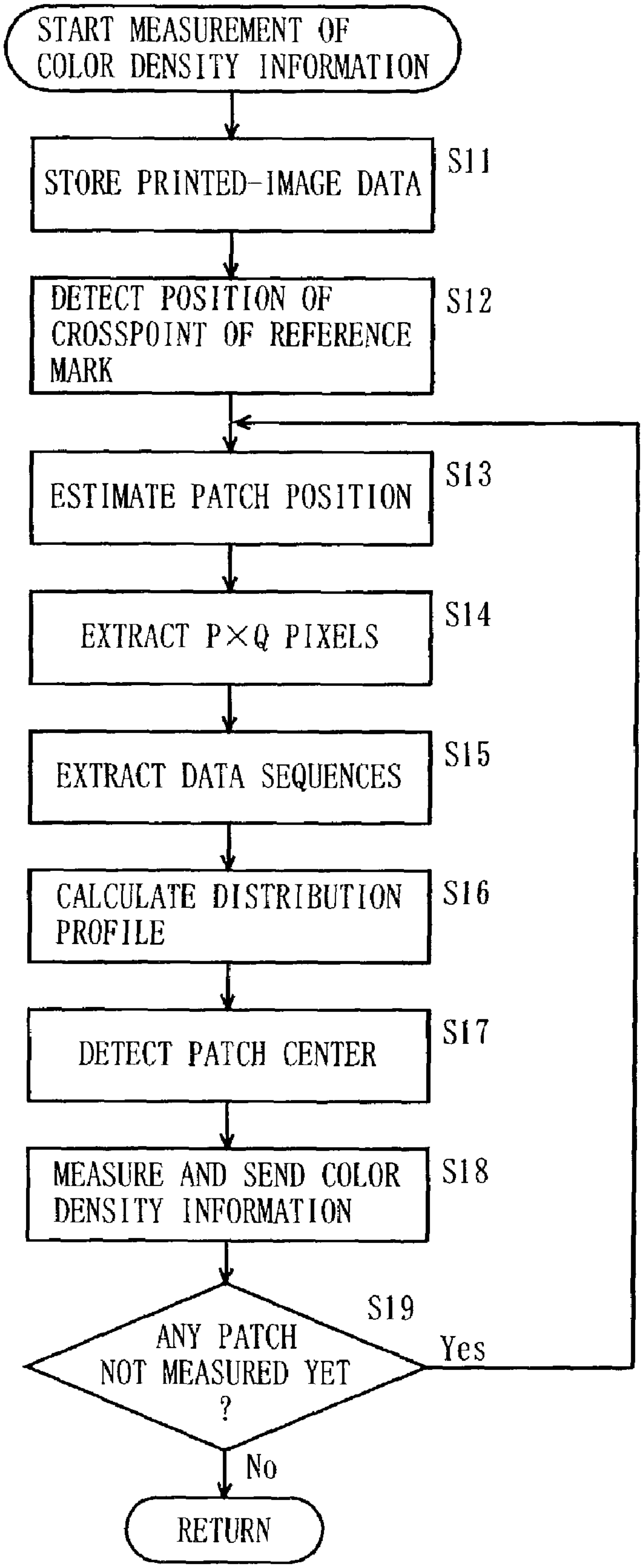
FIG. 8 is a flowchart illustrating the detailed procedure of the process performed at step 5 in FIG. 7 according to the first embodiment of the present invention.
Figure 9A:
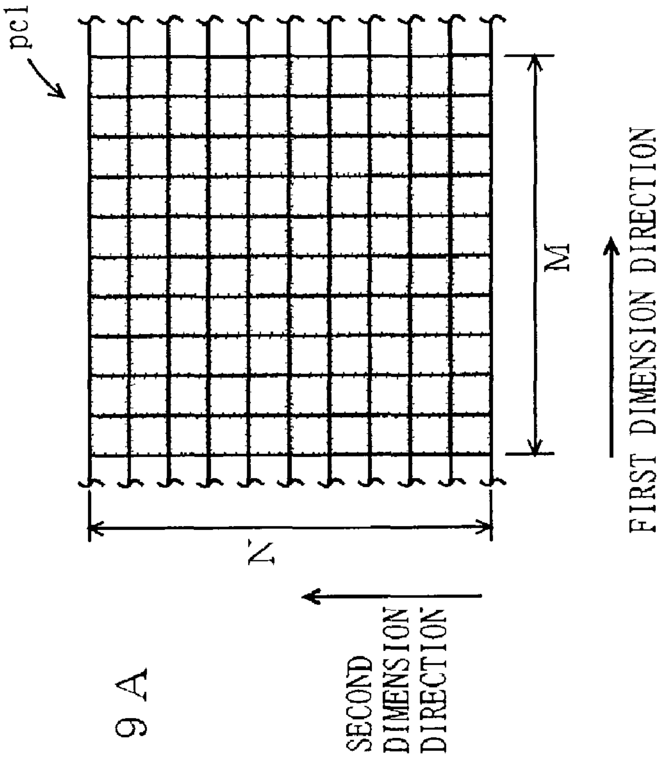
FIG. 9A is a diagram illustrating pixels composing a patch pc1.

Next, the detailed processing procedure of step S5 will be described with reference to FIG. 8. FIG. 8 is a flowchart illustrating the detailed procedure of the process performed at step 5 in FIG. 7 according to the first embodiment of the present invention. Referring to FIG. 8, in the manner described above with reference to FIGS. 4 and 5, the imaging device 26 generates printed-image data Dpd and stores it in the data storage section 271 of the patch measurement device 27 (step S11). The printed-image data Dpd is in the form of a predetermined number of pixels representing the image im, the control strips cs, and the reference marks rm shown in FIG. 16A. As a specific example, the following illustration assumes that the imaging device 26 has a resolution of W dPi (X mm/pixel) and that the patches composing each control strip cs have a square shape of Y mm×Z mm. It is assumed that W=50; X=0.5; and Y=Z=5. As shown in FIG. 9A, the patch pc1 is represented as M×N pixels in the printed-image data Dpd. Under the above assumption, M=N=10. More specifically, M pixels are present along the direction of the first dimension of each patch (corresponding to the second printing direction shown in FIGS. 16A and 16B), whereas N pixels are present along the direction of a second dimension (corresponding to the first printing direction shown in FIGS. 16A and 16B) perpendicular to the first dimension. The following description illustrates the measurement of the color density information Dct of the patch pc1 as described above.

Once step S11 is completed, the reference mark detection section 272 in the patch measurement device 27 performs image processing for a region of the printed-image data Dpd in the data storage section 271 near the reference mark rm, in accordance with the deployed position information Dpn, to detect the position of the crosspoint p of the reference mark rm1 (see FIGS. 16A and 16B) (step S12).

Next, the patch position estimation section 2731 in the patch position detection section 273 estimates a position which is at a distance a along the first printing direction and at a distance b along the second printing direction from the position of the crosspoint p detected by the reference mark detection section 272 (see FIG. 16B) to be the position of the patch pc1 to be currently measured (step S13).

Figure 9B:
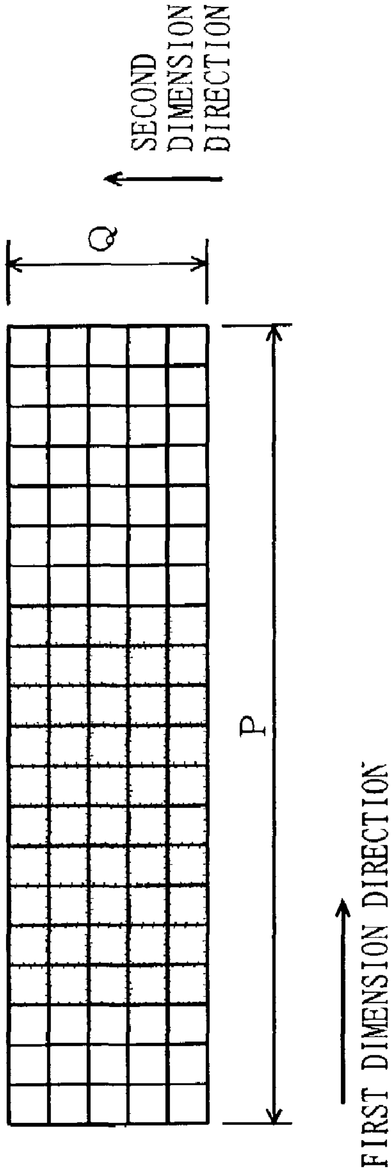
FIG. 9B is a diagram illustrating pixels which are extracted at step S14 in FIG. 7.

Next, from the printed-image data Dpd stored in the data storage section 271, the pixel extraction section 2732 extracts a number of pixels composing a rectangular-shaped region defined by P pixels along the direction of the first dimension by Q pixels along the direction of the second dimension, as shown in FIG. 9B, around the approximate center position of the patch pc1 estimated at step S13 (step S14).

Thus, at step S14, the patch pc1 and its surrounding pixels are extracted. Since M pixels are present in the patch pc1 along the direction of the first dimension under the above assumption, it is necessary that P be a natural number at least greater than M. The reason is that, the distance from the reference mark rm to the patch pc1 along the direction of the first dimension (i. e., along the second printing direction) may contain a considerable error depending on the position of the patch pc1. Therefore, if P were smaller than M, then it would be likely that the pixels extracted at step S14 do not fully encompass the patch pc1 to be measured. Accordingly, in the case where M is 10, P is preferably set at about 20. On the other hand, N pixels are present in the patch pc1 along the direction of the second dimension under the above assumption. However, Q is not of any predetermined relationship with respect to N, but may arbitrarily be set to a number which would be necessary for measuring the color information concerning the patch, e.g., 3 to 5 pixels. The reason is that the distance from the reference mark rm to the patch pc1 along the direction of the second dimension (i.e., along the first printing direction) is substantially constant irrespective of the position of the patch pc1, and is not very likely to be error-prone. Accordingly, Q may be set to be a natural number smaller than N, e.g., 3 to 5 if N=10. As a result, the number of pixels which are extracted at step S14 can be reduced, whereby the processing speed of step S5 can be enhanced.

After the completion of step S14, step S15 is performed, where data sequences x (each consisting of R pixel values) extending and continuous along the direction of the first dimension are sequentially taken from the P×Q pixels shown in FIG. 9B, such that each data sequence x is shifted by one pixel from a previous or next data sequence along the direction of the first dimension. Herein, a natural number R is preferably an odd number which is greater than M. An odd number is preferable for R because it would make it easier for the patch center detection section 2735 to determine a patch center position, as described later. An R which is greater than M is preferably in order to prevent there being two maximum values to represent a patch center position the distribution calculation section 2734 (described later). Since M=10 under the above assumption, R is preferably about 11 or 13. For conciseness, the data sequences x extracted at step S15 will be expressed as:

$x_i=(x_{i1},x_{i2}, \ldots ,x_{iR})$(where i is a natural number in the range from 1 to $(P-R+1)$).

Next, the distribution calculation section 2734 inputs a data sequence $x_i$ which has been extracted by the data sequence extraction section 2733 to a predetermined mathematical function, thereby calculating a parameter ($f_i$) representative of the distribution profile of the pixel values ($x_{i1}$, $x_{i2}$, . . . , $x_{iR}$) composing the data sequence $x_i$ (step S16). According to the first embodiment, a data sequence $x_i$ is inputted to a Kurt function expressed by eq. 1 below to calculate the kurtosis of the data distribution thereof:

$$fi(x_{i1},x_{i2}, \ldots x_{iR}) = \left\{\frac{R(R+1)}{(R-1)(R-2)(R-3)}\sum_{j=1}^{R}\left(\frac{x_{ij}-x_{ave}}{S}\right)\right\} - \frac{3(R-1)^2}{(R-2)(R-3)} \quad \text{eq. 1}$$

In eq. 1 above, Sd is a standard deviation of the samples, $x_{ave}$ is an average value of $x_{i1}$, to $x_{iR}$.

The distribution calculation section 2734 detects the kurtosis of the data distribution with respect to a number of data sequences x of contiguous R pixels, such that the data sequences x are respectively shifted by one pixel along the direction of the first dimension. Next, the distribution calculation section 2734 performs this kurtosis detection for every one of the Q rows in the direction of the second dimension. Then, for each of the Q rows, the patch center detection section 2735 looks for a maximum value among the parameters $f_i$ representative of the distribution profiles calculated by the distribution calculation section 2734, and detects a central pixel of a data sequence $x_i$ having the maximum value as a "patch center position" for that row (step S17). In the case where a Kurt function is adopted as in the above example, step S17, the kurtosis maximum value is looked for.

Figure 10:
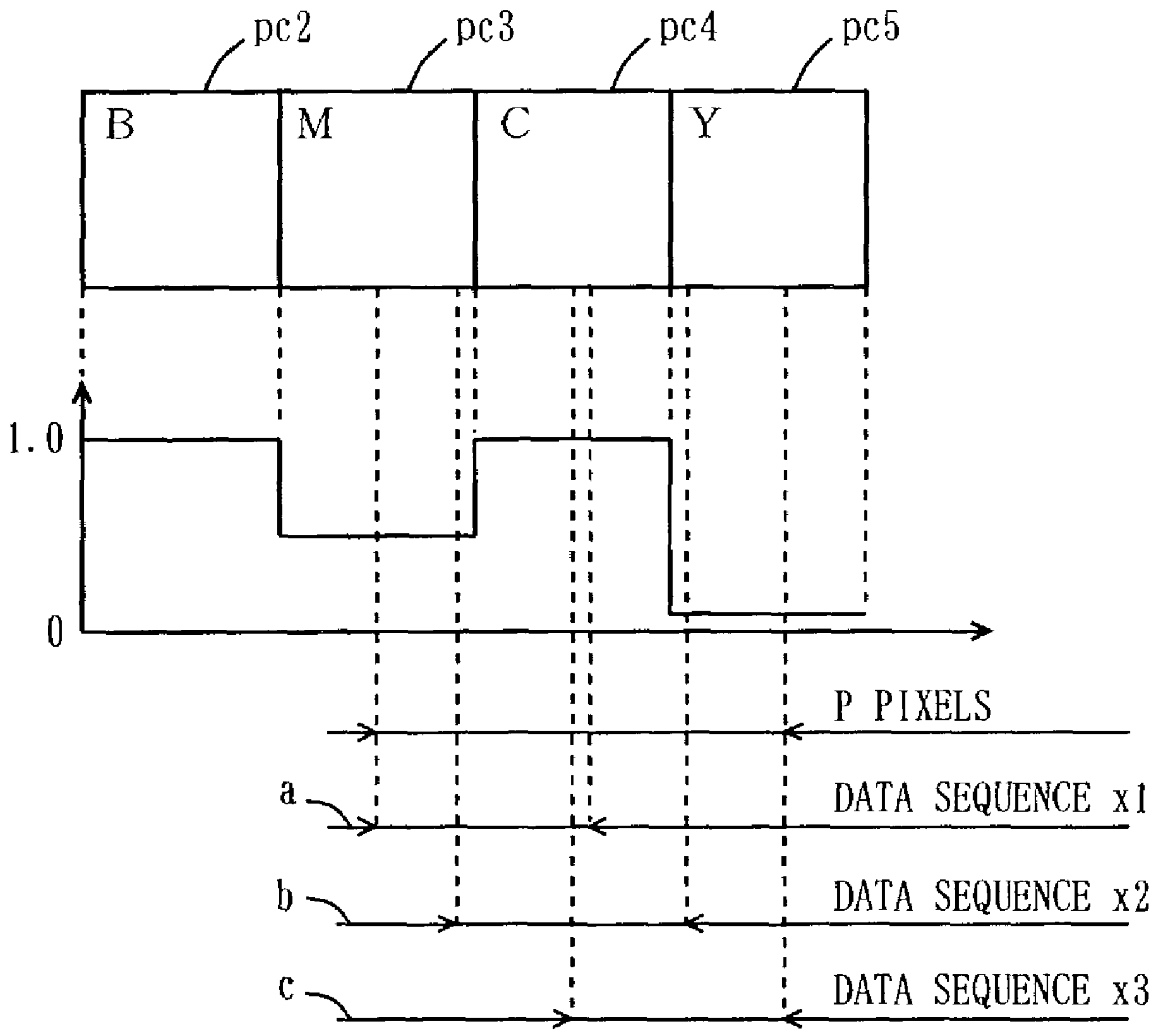
FIG. 10 is a diagram illustrating the principles behind the processes of steps S16 and S17 in FIG. 8.

Now, the principles behind the processes of steps S16 and S17 are described with reference to FIG. 10. FIG. 10 illustrates a control strip cs consisting of four patches pc2 to pc5, each having a 100% density (i.e., "solid"), which are arranged in the color order of B, M, C, and Y. For conciseness, among the colors of R, G, and B which result from the color separation by the imaging device 26, only R(red) will be discussed. If this imaging device 26 images the control strip illustrated in FIG. 10, the resultant readouts, i.e., pixel values, will be "1" for the B and C patches, "0.5" for the M patch, and virtually "0" for the Y patch.

Now, the patch pc4 will be discussed. As shown in FIG. 10, it is assumed that step S15 according to the present embodiment extracts data sequences $x_i$ (shown as data sequences $x_1$ to $x_3$; see pairs of arrows a, b, and c in FIG. 10, respectively) each consisting of R pixel values (where R=11 or 13) from P pixels (where P=20) lying before, in, and after the patch pc4. Under this assumption, the pair of arrows b most adequately encompass the pixels of the patch pc4. Therefore, the data distribution of the data sequence $x_2$ is determined to be most "pointed".

Next, the color density measurement section 274 retrieves the pixels located at the patch center detected by the patch center detection section 2735 from the data storage section 271, and measures the color density information Dct (e.g., density and/or dot percentage) of the printed patch. For example, assuming Q=3, it would be possible to obtain 3×3 pixels around the patch center by taking three pixels around the “patch center” for each of three rows present along the direction of the second dimension. Furthermore, the color density measurement section 274 sends the measured color density information Dct to the print control section 21 (step S18).

Next, the patch measurement device 27 determines whether or not there are any patches whose color density information Dct has not been measured yet(step S19). If there are any such patches, the control returns to step S13 to obtain color density information Dct of an unmeasured patch. On the other hand, if it is determined that the measurement has been completed for all patches, the patch measurement device 27 ends the procedure of FIG. 8.

At step S6, as described above, based on the color density information Dct from the patch measurement device 27, as described above, the print control section 21 generates and outputs control information Dc1, in accordance with which to adjust the supply amounts of ink and/or dampening water used in the aforementioned printing mechanism 23. Thus, the amount of ink supplied from the ink supply unit 239 and/or the amount of dampening water supplied from the dampening water supply unit 238 are automatically controlled.

As described above, in accordance with the patch measurement device 27 of the first embodiment, it is possible to directly derive a patch center position from a number of pixels obtained based on the position of a reference mark, as opposed to the conventional technique of identifying a patch position based solely on the relative position of a patch with respect to reference mark. Thus, the patch measurement device 27 is capable of accurately measuring color density information Dct.

Moreover, in accordance with the patch measurement device 27 of the first embodiment, even if the shape of an imaged patch is deformed (e.g., so as to appear as a parallelogram) in the printed-image data Dpd, it is still possible to directly detect a patch center position from the printed-image data Dpd by calculating a kurtosis value of data distribution for each of a plurality of data sequences, i.e., Q rows in the direction of the second dimension. Thus, the patch measurement device 27 is capable of accurately measuring color density information Dct irrespective of the deformation of patches.

The present embodiment is illustrated as employing the above-described Kurt function to calculate a distribution profile; however, the constants used in the Kurt function are not limited to those shown in eq. 1 above. It would be possible to employ various modifications of the Kurt function, or a specially-designed function which is capable of calculating a data distribution profile, in the patch measurement device 27. Although the present embodiment illustrates the detection of a patch center position, this is only to be construed as a preferable example; it would be applicable to detect any other position in a patch.

(Second Embodiment)

Next, as a second embodiment of the present invention, a patch measurement device 27*i* (FIG. 13) which is capable of properly detecting reference marks rm without misdetections, and which requires a minimum amount of printed-image data Dpd for color density measurement so as to realize an enhanced calculation speed, will be described. Hereinafter, the patch measurement device 27*i* according to the second embodiment will be described.

The second embodiment is identical to the first embodiment already described with reference to FIG. 1 to FIG. 3 with respect to: a printing system configuration incorporating the patch measurement device 27*i*, the specific structure of the terminal 1, and the structures of the prepressing mechanism 22 and the printing mechanism 23. The structure of the image-to-print data Dpg and the printed material S which are produced by this printing system are also similar to those described with reference to FIG. 16 in the first embodiment. Therefore, the description of any such elements that have similar counterparts in the first embodiment will be omitted in the second embodiment.

Figure 11:
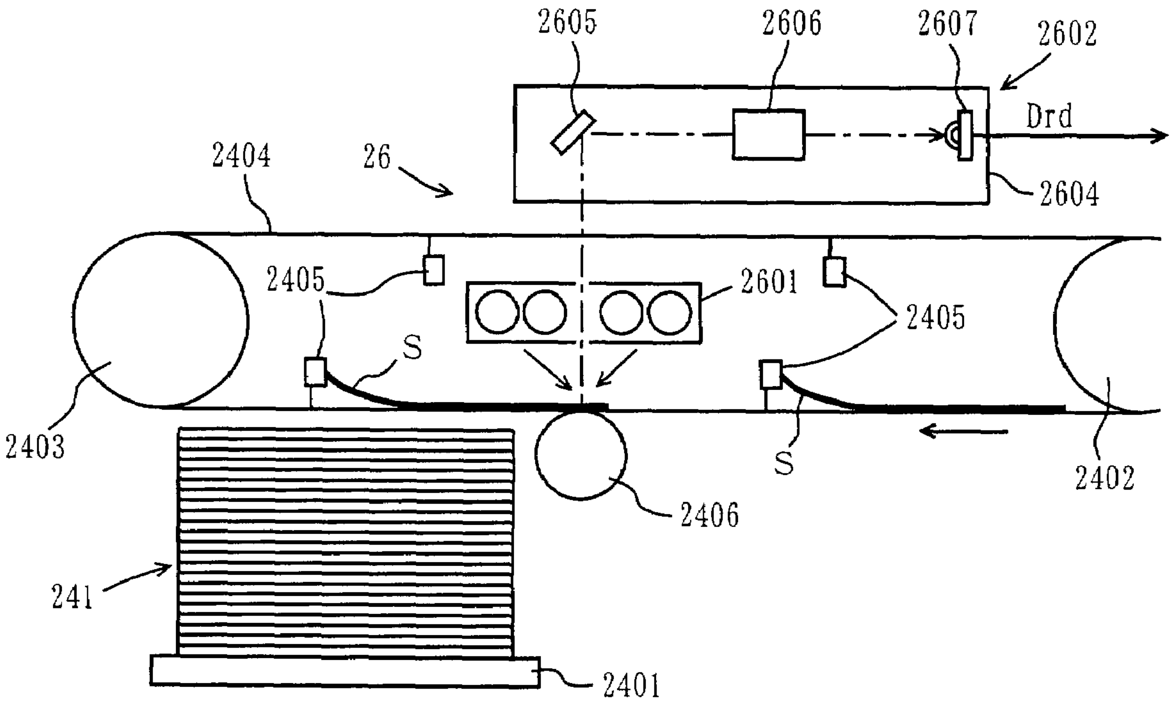
FIG. 11 is a schematic side view illustrating the detailed structures of the discharge unit 241 shown in FIG. 3 and the imaging device 26 according to the second embodiment of the present invention.

The details of the imaging device 26 according to the second embodiment will be described with reference to FIG. 11. FIG. 11 is a schematic side view illustrating the detailed structures of the discharge unit 241 and the imaging device 26 according to the second embodiment of the present invention. In the second embodiment, the discharge unit 241 shown in FIG. 11 has the same structure as the discharge unit 241 in the first embodiment described with reference to FIG. 4. The imaging device 26 according to the second embodiment is identical to the imaging device 26 of the first embodiment described with reference to FIG. 4 except that an image synthesis section 2603 is not provided. Therefore, any component elements that have similar counterparts in the first embodiment will be denoted by the same reference numerals as those used therein, and the description thereof is omitted.

Referring to FIG. 11, according to the second embodiment, each imaging unit 2602 images an illuminated printed material S through a slit in the lighting unit 2601 to generate printed-image data Dpdi representing a read-out region (described later), which includes the control strips cs and the reference marks rm (see FIGS. 16A and 16B). As the printed material S is transported, a read-out region of the printed material S is sequentially read in a line-by-line manner. Thus, by the time the read-out region of the printed material S has passed immediately under the lighting unit 2601, the CCD line sensor 2607 will have produced read-out image data Drd, from which printed-image data Dpdi corresponding to the read-out region of one printed material S is generated.

Figure 12:
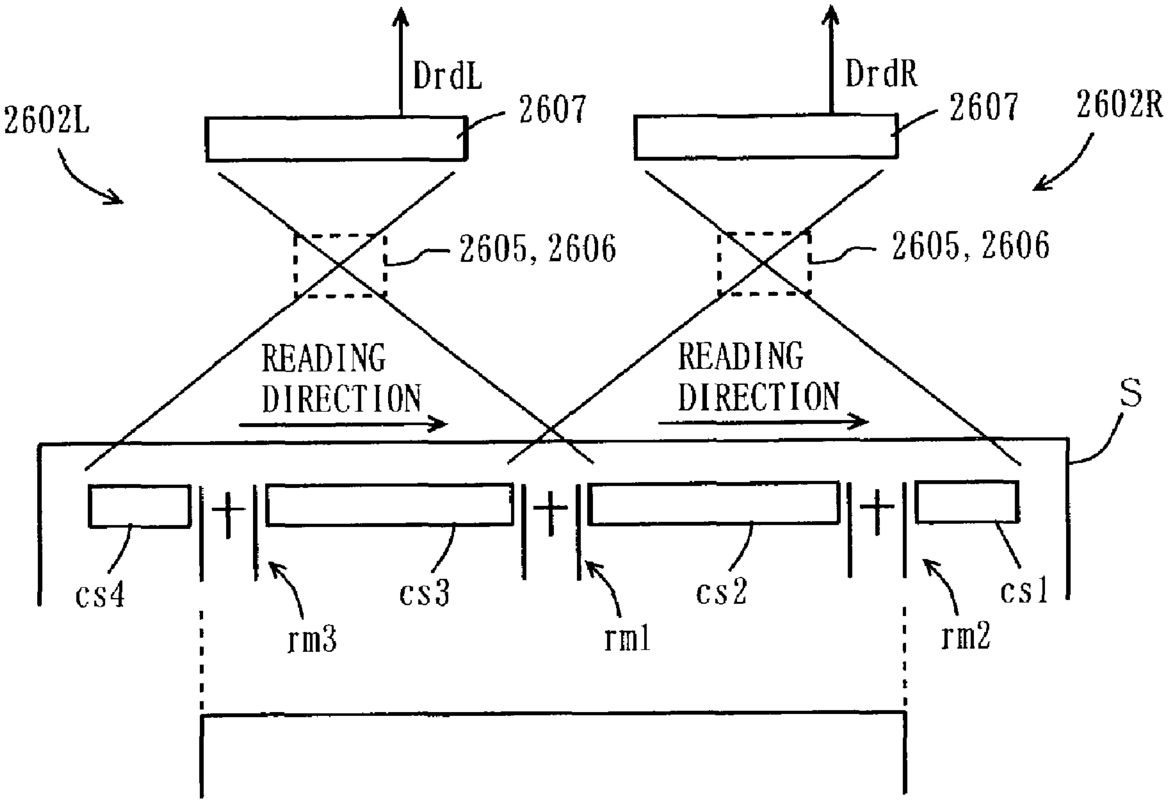
FIG. 12 is a diagram for specifically describing two imaging units 2602 shown in FIG. 11.

In the second embodiment, the two imaging units 2602 are disposed along a direction perpendicular to the plane of the drawing of FIG. 11. The imaging units 2602 capture images of two split portions of the printed material S to generate respective read-out image data Drd, the division being made along the second printing direction. FIG. 12 is a diagram for specifically describing the two imaging units 2602 shown in FIG. 11. For conciseness, the imaging unit appearing on the left-hand side of FIG. 12 will hereinafter be referred to as the “imaging unit 2602L” and the other imaging unit as the “imaging unit 2602R”. The respective read-out image data Drd generated by the imaging units 2602L and 2602R are referred to as “read-out image data DrdL” and “read-out image data DrdR”. As described above, the imaging regions of the imaging unit 2602L and the 2602R generally correspond to the left-side portion and the right-side portion of the printed material S, respectively. Both imaging regions are arranged so as to overlap preferably in the neighborhood of a center line (extending parallel to the first printing direction of the printed material S). Moreover, the printing apparatus 2 is arranged so as to print the reference marks rm1 to rm3 at positions which will be safely within a printed material S having a marginal (i.e., minimum usable) width. The image-to-print data Dpg is generated in such a manner that the reference mark rm1 will be positioned in the aforementioned overlapping region.

On the other hand, the reference marks rm2 and rm3 are printed near the left and right ends of the printed material S, so that the reference marks rm1 and rm2 will be imaged by the imaging unit 2602L and that the reference marks rm1 and rm3 will be imaged by the imaging unit 2602R. Thus, each of the imaging units 2602L and 2602R images two reference marks rm. Based on such detection of the positions of the reference marks rm1 to rm3, it is possible to know the approximate positions of the control strips cs1 to cs4 because they are supposed to be printed at predetermined positions relative to the detected reference marks rm1 to rm3. In order to be able to image a single printed material S by means of the imaging units 2602L and 2602R, the respective CCD line sensors 2607 in the imaging units 2602L and 2602R are oriented so that their reading directions coincide. The imaging units 2602L and 2602R send the generated read-out image data DrdL and DrdR, respectively, to the patch measurement device 27*i* as printed-image data Dpdi.

Figure 13:
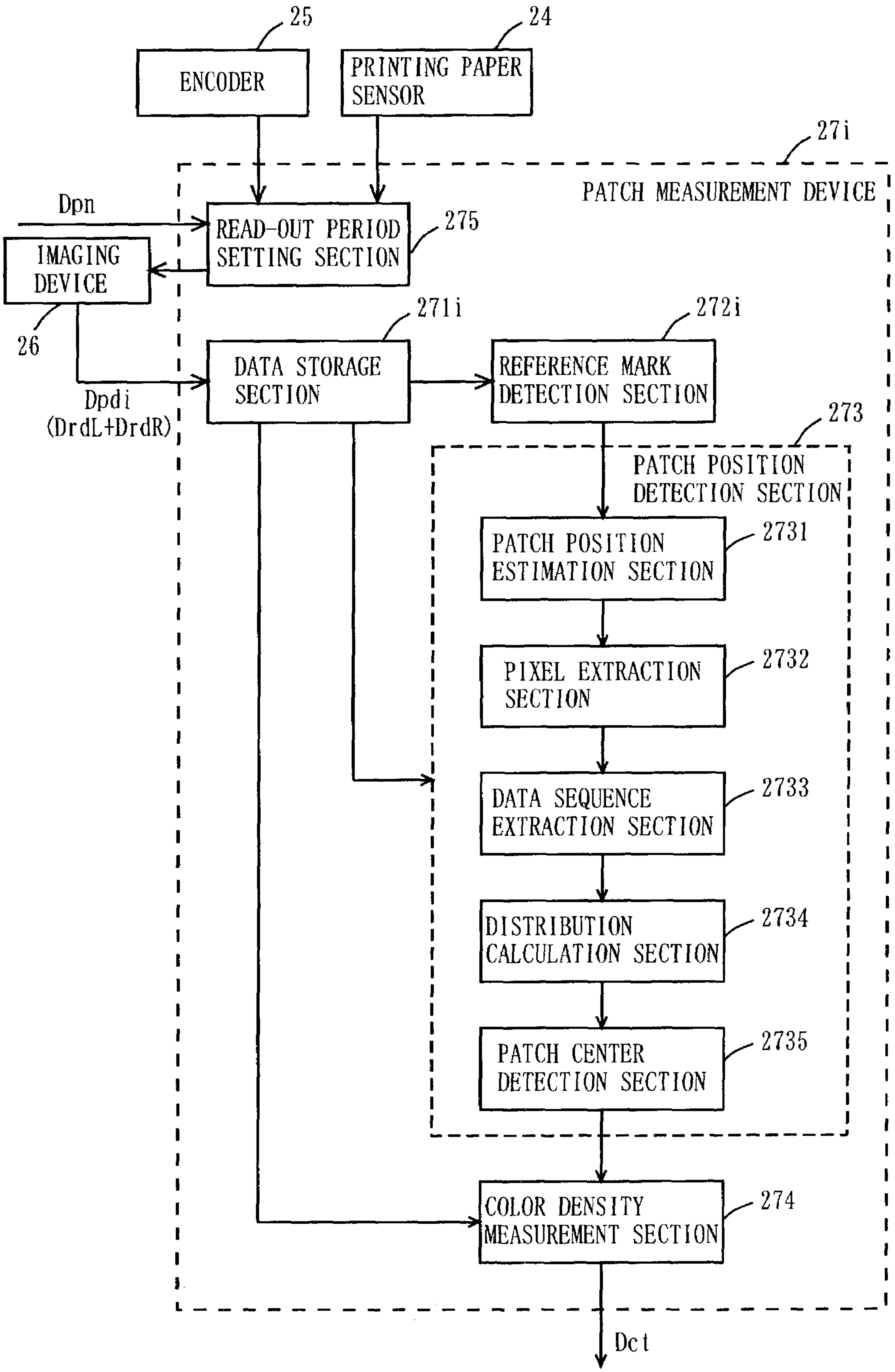
FIG. 13 is a functional block diagram illustrating the detailed structure of a patch measurement device 27*i* according to the second embodiment of the present invention.

Next, the detailed structure of the patch measurement device 27*i* according to the second embodiment will be described. FIG. 13 is a functional block diagram illustrating the detailed structure of the patch measurement device 27*i*. The patch measurement device 27*i* comprises: a read-out period setting section 275 for setting a read-out region for the imaging device 26 based on deployed position information Dpn; a data storage section 271*i* for storing printed-image data Dpdi representing the read-out region, which is composed of the read-out image data DrdL and DrdR generated by the imaging device 26; a reference mark detection section 272*i* for detecting the position of a reference mark rm based on the printed-image data Dpdi; a patch position detection section 273 for detecting the positions of patches composing each control strip cs based on the detected position of the reference mark rm; and a color density measurement section 274 for measuring color density information Dct.

Based on the deployed position information Dpn, an encoder signal from the encoder 25, and a paper detection signal from the printing paper sensor 24, the read-out period setting section 275 sets a read-out period so that the imaging device 26 will image, or "read", a read-out region encompassing a region in which the control strips cs are printed and a blank region on the printed material S. Specifically, the read-out period setting section 275 detects where on the discharge unit 241 the printed material S is located by counting the encoder signal from the encoder 25, and based on the count of the encoder signal, determines when the aforementioned read-out region (encompassing a region in which the control strips cs are printed and a blank region on the printed material S) as designated by the deployed position information Dpn comes at the read position of the imaging device 26. Accordingly, the read-out period setting section 275 instructs the imaging device 26 to begin or end image reading.

However, since the printing apparatus 2 is designed so that printing paper is fed or discharged for every two rotations of the impression cylinder 235. Therefore, practically speaking, the printing paper is transported only once in two rotations. Accordingly, the printing apparatus 2 relies not only on the encoder signal but also on the paper detection signal from the printing paper sensor 24 to ensure that imaging is performed only while a printed material S is being transported under the imaging device 26. As described earlier, the measurement of the control strips cs is performed for a predetermined number of samples. Thus, when it is known from the paper detection signal that the impression cylinder 235 is making a rotation at which the printed material S is transported under the imaging device 26, the read-out period setting section 275 estimates the transported position of the printing paper by relying on the rotary position of the impression cylinder 235 as indicated by the encoder signal, and instructs the imaging device 26 to perform imaging during a read-out period. Preferably, the read-out region to be read by the imaging device 26 is set so as to be larger than and inclusive of the region in which the control strips cs are printed and the blank region, so that a slight misalignment will not be a problem.

Based on an instruction from the read-out period setting section 275, the imaging device 26 images the aforementioned read-out region of the printed material S, and stores the generated read-out image data DrdL and DrdR in the data storage section 271*i* a sprinted-imaged at a Dpdi. The data storage section 271*i* includes two sets of memory corresponding to the imaging units 2602R and 2602L. Among the printed-imaged at a Dpdi, the read-out image data DrdL generated by the imaging unit 2602L (or the read-out image data DrdR generated by the imaging unit 2602R) is stored in the memory in a backward direction beginning from the end thereof. As a result, it becomes possible to read the read-out image data DrdR and DrdL obtained from the imaging units 2602R and 2602L in the same procedure. Instead of storing the read-out image data DrdR or DrdL in a back ward direction in the memory as the printed-image data Dpdi, one of the CCD line sensors 2607 may be oriented so as to perform reading in an opposite direction.

Figure 17:
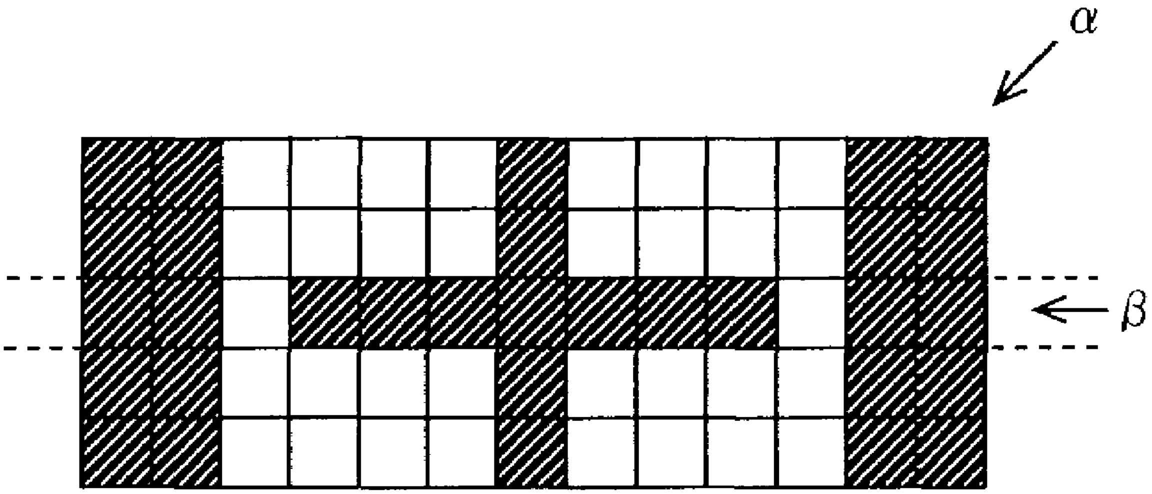
FIG. 17 is a diagram illustrating an exemplary pixel pattern of an α region which is in the neighborhood of the center of a cross mark c shown in FIG. 16B.

The reference mark detection section 272*i* detects the reference marks rm (see FIGS. 16A and 16B) from the printed-image data Dpdi through image processing. The detection of the reference marks rm begins by previously obtaining a pixel pattern of the neighborhood of the center of the cross mark c interposed between the bars b1 and b2 in the reference mark rm. FIG. 17 illustrates an exemplary pixel pattern of an $\alpha$ region, which is in the neighborhood of the center of the cross mark c shown in FIG. 16B. For ease of understanding, the illustrated example is made purposely schematic. A center line $\beta$ of the cross mark c consists of: two black pixels on each side (constituting the width of each of the bars b1 and b2); a white pixel interposed between a horizontal stroke of the cross mark c and each of the bars b1 and b2; and seven black pixels composing the entire horizontal stroke of the cross mark c. Next, it is determined whether or not the pixel pattern of the center line $\beta$ is contained in the printed-image data Dpdi stored in the data storage section 271*i*, while shifting the examined pixels one by one, thereby calculating a correlation coefficient $\rho m$ each time. The reference mark detection section 272*i* applies this calculation with respect to each of the X and Y directions (which are perpendicular to each other) of the printed-image data Dpdi stored in the data storage section 271*i*. Then, the reference mark detection section 272*i* compares the resultant correlation coefficients $\rho m$, and determines a position associated with the maximum correlation coefficient $\rho m$ as the position of the reference mark rm. The details of this calculation will be described later.

The patch position detection section 273 and the color density measurement section 274 function similarly to their counterparts in the first embodiment, and any detailed descriptions thereof will be omitted in the illustration of the patch measurement device 27*i* according to the second embodiment.

Next, the overall operation of the printing system according to the second embodiment will be described. The overall operation of the printing system is the same as that in the first embodiment described with reference to FIG. 7, except for the specific procedure of measuring color density information (step S5). Therefore, in the second embodiment, the general operation of the printing system will not be described, but the specific procedure of the process of step S5 will be described with reference to FIG. 14.

Figure 14:
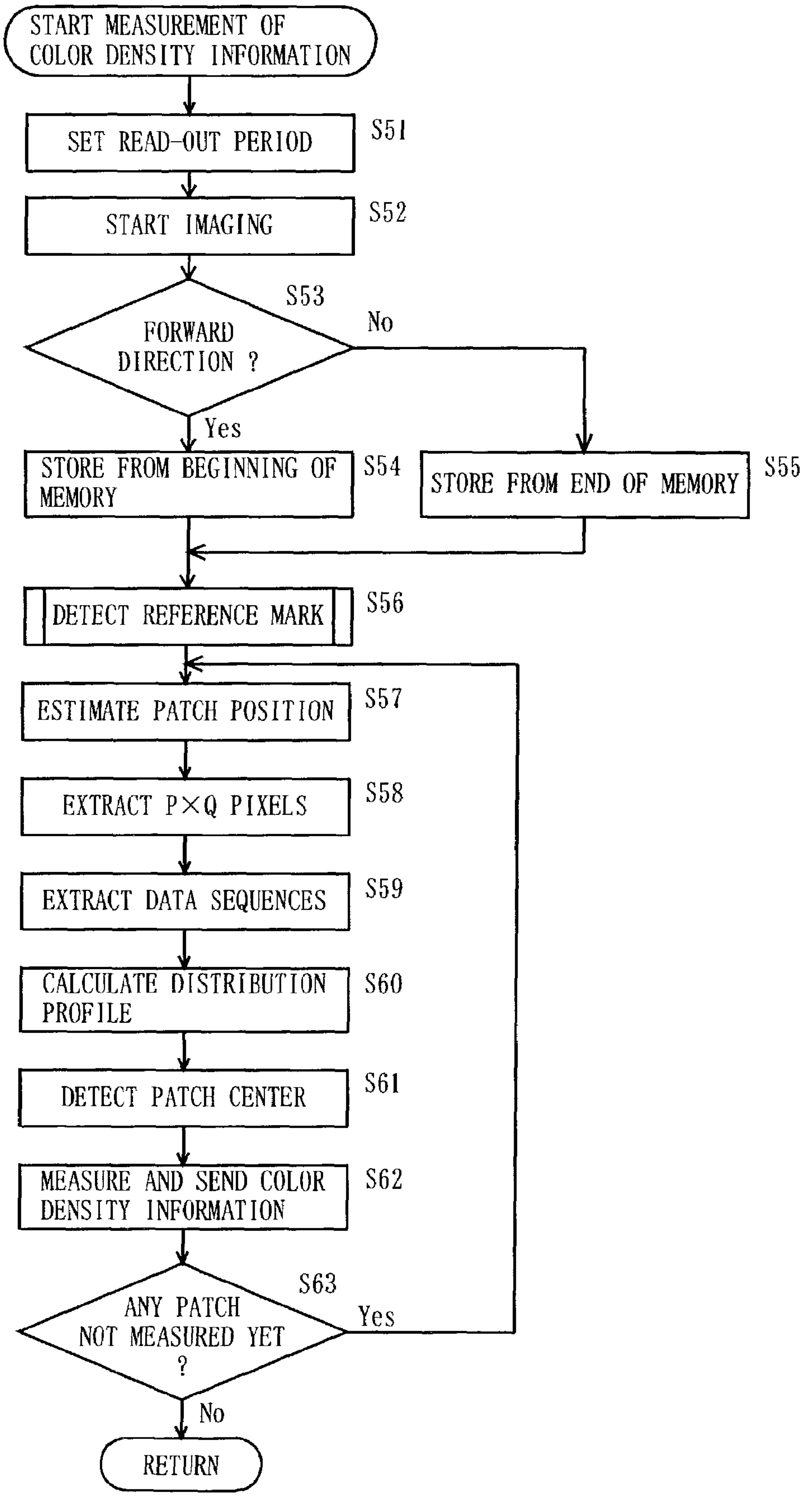
FIG. 14 is a flowchart illustrating the detailed procedure of the process performed at step S5 in FIG. 7 according to the second embodiment of the present invention.

Referring to FIG. 14, the read-out period setting section 275 in the patch measurement device 27*i* sets a read-out period based on the deployed position information Dpn in the aforementioned manner (step S51), and the control proceeds to the next step 52.

Next, as the read-out period begins, the imaging units 2602L and 2602R begins imaging the read-out region of the printed material S, thereby generating read-out image data DrdL and DrdR as printed-image data Dpdi (step S52), which is outputted to the patch measurement device 27*i*. Then, the control proceeds to the next step 53.

Next, the patch measurement device 27*i* determines whether the printed-image data Dpdi which is outputted at step S52 is read-out image data DrdR or not(step S53). If it is determined to be read-out image data DrdR, the control proceeds to step S54. If it is determined to be read-out image data DrdL, the control proceeds to step S55.

At step S54, the patch measurement device 27*i* stores as printed-image data Dpdi the read-out image data DrdR (obtained from the imaging unit 2602R) in the forward direction in a corresponding memory of the data storage section 271*i*. On the other hand, at step S55, the patch measurement device 27*i* stores as printed-image data Dpdi the read-out image data DrdL (obtained from the imaging unit 2602L) in the backward direction in a corresponding memory of the data storage section 271*i*.

Once the storage of the printed-image data Dpdi at step S54 or S55 is completed, the patch measurement device 27*i* subjects the printed-image data Dpdi in the respective memory to image processing to detect a reference mark rm (step S56). The details of the process of step S56 will be described later. Then, the control proceeds to the next step S57.

The procedure following the process of step S56 (step S57 to S63) in which the patch measurement device 27*i* measures the color density information Dct with respect to each patch is similar to the procedure of step S13 to S19 according to the first embodiment as described with reference to FIG. 8, and the detailed description thereof is omitted.

Figure 15:
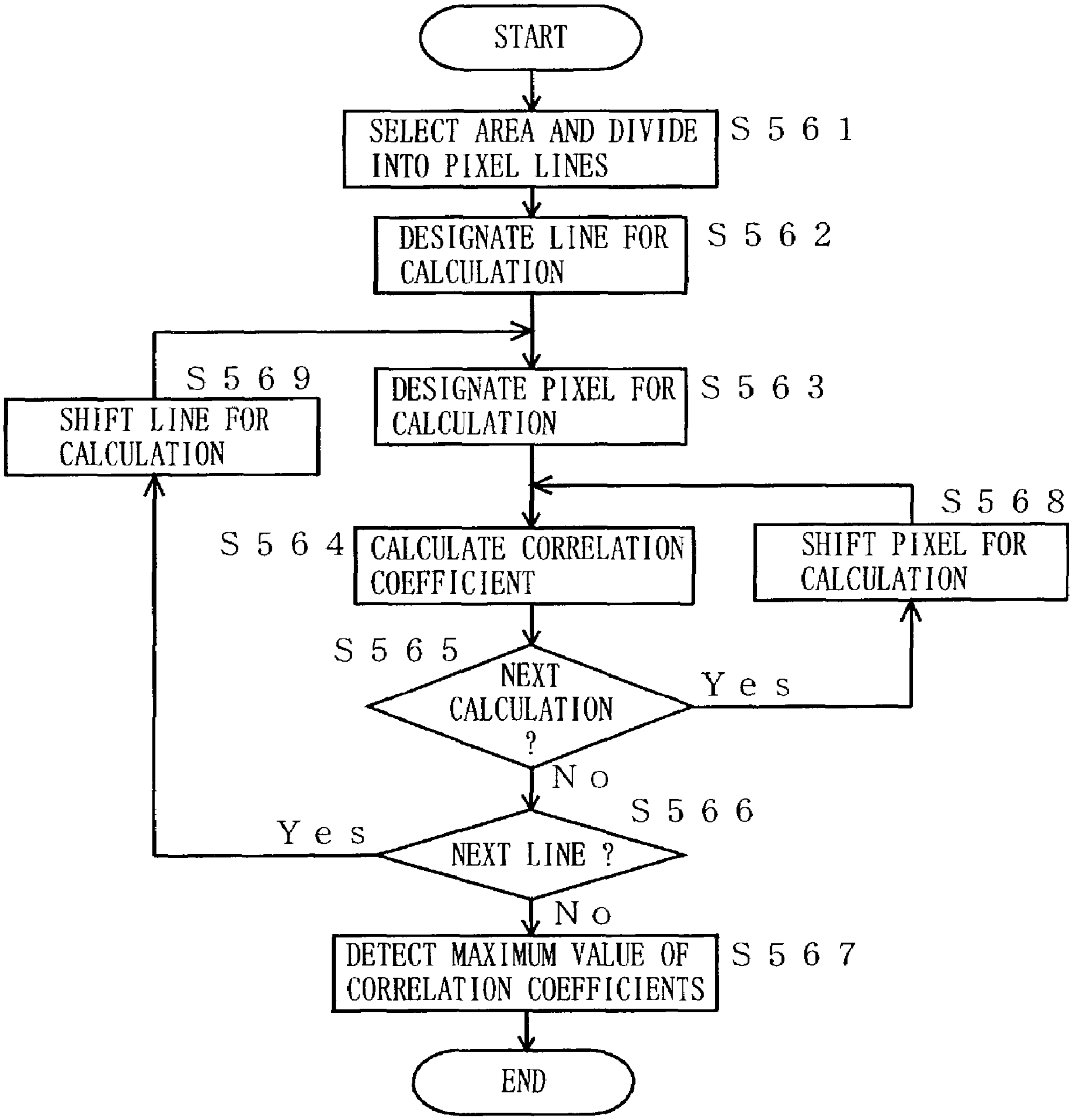
FIG. 15 is a flowchart illustrating the detailed procedure of the process performed at step S56 in FIG. 14.

Next, the specific calculation for the reference mark detection performed at step S56 will be described. FIG. 15 is a flowchart illustrating the detailed procedure of the reference mark detection calculation performed by the patch measurement device 27*i* at step S56. Hereinafter, the reference mark detection calculation will be described with reference to FIG. 15.

Referring to FIG. 15, from the printed-image data Dpdi stored in the respective memory, the patch measurement device 27*i* selects a general area of the printed-image data Dpdi in which a reference mark rm (see FIGS. 16A and 16B) to be processed is located, by relying on the aforementioned deployed position information Dpn and the like; then, the selected area is divided into a plurality of pixel lines (step S561). Thereafter, the control proceeds to the next step S562.

Next, the patch measurement device 27*i* selects one of the plurality of pixel lines that is closest to the leading end along the first printing direction (see FIG. 16A), and designates this pixel line as a first line for calculation (step S562). Then, the control proceeds to the next step S563.

Next, the patch measurement device 27*i* designates one of the plurality of pixels in the designated line for calculation that is positioned at one edge along the second printing direction (see FIG. 16A) as a first pixel for calculation (step S563). Then, the control proceeds to the next step S564.

Next, the patch measurement device 27*i* calculates a correlation coefficient ρm between "subject data" (i.e., data centered around the pixel for calculation) and the pixel pattern of the center line β representative of the center of the reference mark rm (see FIG. 17)(step S564).

Now, the correlation coefficient ρm which is calculated at step S564 will be described in detail. First, a pixel pattern of the neighborhood of the center of the cross mark c interposed between the bars b1 and b2 in the reference mark rm is previously obtained. In the exemplary pixel pattern of the aforementioned α region in the neighborhood of the center of the cross mark c shown (see FIGS. 16A and 16B and FIG. 17), which is schematically illustrated for ease of understanding, the center line β of the cross mark c consists of thirteen pixels, namely: two black pixels on each side (constituting the width of each of the bars b1 and b2); a white pixel interposed between a horizontal stroke of the cross mark c and each of the bars b1 and b2; and seven black pixels composing the entire horizontal stroke of the cross mark c. The pixel pattern of the center line β is used as a key pattern x representing the reference mark rm. A binary expression (black=1; white=0) of this key pattern x would be:

$$x=(1,1,0,1,1,1,1,1,1,1,0,1,1,).$$

The subject data, y, which is centered around the pixel for calculation also consists of thirteen pixels as does the key pattern x. Thus, the subject data y is:

$$y=(y_{-6},y_{-5},y_{-4},y_{-3},y_{-2},y_{-1},y_0,y_{+1},\ y_{+2},y_{+3},y_{+4},y_{+5},y_{+6}).$$

The correlation coefficient ρm between the key pattern x and the subject data y is calculated. The correlation coefficient ρm can be expressed as:

$$\begin{aligned}\rho m &= ([x]*[y]) - ([x]^{-1}*[y])\\ &= [y]*([x]-[x]^{-1}).\end{aligned}$$

Herein, the term [x]*[y] in the above equation is defined as a sum of the multiplication products of corresponding elements of the respective matrices, as opposed to a mathematical product of the two matrices in the traditional sense. Specifically, if each matrix consists of one row×three columns, then, $$(u1v1w1)*(u2v2w2)=(u1\times u2)+(v1\times v2)+(w1\times w2).$$

Note that $[x]^{-1}$ is a matrix representing an inverted pattern of the key pattern x.

The above calculation formula for the correlation coefficient ρm is only illustrative of the principles of the present invention. According to the present embodiment, in order to calculate a more accurate correlation with the aforementioned pixel pattern, the correlation coefficient ρm is weighted in accordance with the signal level of the printed-image data Dpdi and the shape of the pixel pattern so that the highest correlation will be indicated by a correlation coefficient ρm=1 and that the lowest correlation will be indicated by a correlation coefficient ρm=−1. Hereinafter, the calculation method thereof is described in detail.

As described above, the CCD line sensors 2607 provided in the imaging device 26 read images with respect to the three colors of RGB, and send printed-image data Dpdi of each of the RGB colors to the data storage section 271*i*. In other words, in the case of a black reference mark rm, the signal levels of all of RGB become low for a black pixel, and the signal levels of all of RGB become high for a white pixel. In the second embodiment, the calculations are performed under the hexadecimal system, and the highest signal level corresponding to a white pixel is represented as hexadecimal "6000" (hereinafter denoted as "6000h"), the lowest signal level corresponding to a black pixel is represented as hexadecimal "0" (hereinafter denoted as "0h"). Therefore, the actual signal level of each CCD line sensor 2607 takes a value in the range from "0h" to "6000h".

The weighed correlation coefficient ρm can be expressed by the following formula:

$$\rho m=([DDi]-[y])*\{[x]/(SM\times 6000h)-[x]^{-1}/(SMR\times 6000h)\} \quad \text{eq. 2.}$$

In eq. 2, the brackets [ ] are used to denote a matrix. The notation [ ]*[ ] represents a sum of the multiplication products of corresponding elements of the respective matrices, as opposed to a mathematical product of the two matrices in the traditional sense, as defined above. Hereinafter, the individual terms in the above formula will be described.

First, matrix [y] is a matrix of the subject data y consisting of thirteen pixels as described above. In other words, the matrix of the subject data y is represented as:

$$[y]=(y_{-6}y_{-5}y_{-4}y_{-3}y_{-2}y_{-1}y_0y_{+1}y_{+2}y_{+3}y_{+4}y_{+5}y_{+6}).$$

Herein, data $y_{-6}$ to $y_{+6}$ are represented so that their highest signal level corresponding a white pixel is "6000h" and that their lowest signal level corresponding to a black pixel is "0h", in a manner similar to the above.

Matrix [DDi] is a dummy matrix all of whose thirteen pixels are white. In other words, matrix [DDi] is represented as:

$$[DDi]=(6000h6000h6000h6000h6000h6000h6000h\ 6000h6000h6000h6000h6000h6000h).$$

The term ([DDi]−[y]) in eq. 2 above expresses a result of subtracting the matrix of the subject data y from the dummy matrix, all of whose signal levels are high. Therefore, the term ([DDi]−[y]) is calculated so as to have high signal levels for any subject data y whose pixels have low signal levels, and low signal levels for any subject data y whose pixels have high signal levels. For example, this term will be calculated so as to have a high signal level for any black pixel in subject data y. Thus, this term provides an expression on the basis of black pixels, under which the black pixels are represented by the highest signal levels.

Matrix [x] is a matrix representing the key pattern x already on the basis of black pixels, i.e., the black pixels are represented as "6000h" and the white pixels are represented as "0h". For example, if the pixel pattern of the center line β shown in FIG. 17 is used as the key pattern x, then matrix [x] can be expressed as:

$$[x]=(6000h6000h0h6000h6000h6000h6000h\ 6000h6000h6000h0h6000h6000h).$$

Matrix $[x]^{-1}$ represents an inverted pattern of matrix [x], that is:

$$[x]^{-}=(0h0h6000h0h0h0h0h0h0h0h6000h\ 0h0h).$$

A coefficient SM is a weighting factor for the key pattern x. The coefficient SM is a sum of all pixel data in the key pattern x, where the black pixels are represented as "6000h" and the white pixels are represented as "0h". For example, if the key pattern x is the aforementioned center line β, then the coefficient SM=6000h×11+0h×2, since there are eleven pixel data representing "6000h" and two pixel data representing "0h".

A coefficient SMR is a weighting factor for the inverted key pattern x. For example, if the key pattern x is the aforementioned center line β, then the coefficient SMR=6000h×2+0h×11, since there are eleven pixel data representing "0h" and two pixel data representing "6000h" in the inverted key pattern x.

The terms (SM×6000h) and (SMR×6000h) in eq. 2 provide weighting for the key pattern x and the inverted key pattern x, respectively, ensuring that the highest correlation will be indicated by a correlation coefficient ρm=1 and that the lowest correlation will be indicated by a correlation coefficient ρm=−1.

Next, the principle by which eq. 2 produces a high correlation for pixel data coinciding with the reference mark rm will be described. In accordance with the conventional calculation for the correlation coefficient ρ, which involves division by standard deviations σx×σy, any pattern resembling the key pattern x due to flares in the optical system, print smears, and the like would have indicated a high correlation even if their signal levels are different. In contrast, according to eq. 2 of the present invention, the calculated value of the term ([DDi]−[y]) becomes small for any resembling pattern having different signal levels, resulting in an appropriately small correlation coefficient ρm. Thus, if the subject data y is a pattern which resembles the key pattern x but has different signal levels from those of the key pattern x, eq. 2 produces a small resultant correlation coefficient ρm, thereby properly indicating a low correlation.

On the other hand, if the subject data y and the key pattern x do not resemble each other but happen to have the same signal level, e.g., if the key pattern x is the center line β shown in FIG. 17 and the data $y_{-6}$ to $y_{+6}$ of matrix [y] of the subject data y are all "0h" (i.e., a solid patch all of whose pixels are black), then the value of the term ([DDi]−[y]) in eq. 2 becomes maximum. However, the value of the term $([DDi]-[y])*[x]^{-1}$ (where the function of * is as defined above), which is to be subtracted from the final value of the correlation coefficient ρm, also becomes maximum. Therefore, due to the drastic subtraction, the resultant correlation coefficient ρm becomes small in the case where the subject data y is the aforementioned solid patch. In contrast, if the subject data y is the pixel pattern constituting the center line β, then the resultant correlation coefficient ρm becomes maximum to indicate a high correlation, because the value of the term $([DDi]-[y])*[x]^{-1}$ (where the function of * is as defined above) becomes small.

As described above, the CCD line sensors 2607 provided in the imaging device 26 read images with respect to the three colors of RGB, and send printed-image data Dpdi of each of the RGB colors to the data storage section 271*i*. In the case of a black reference mark rm, the calculation of the correlation coefficient ρm is performed for each of RGB images to determine correlation. In the case of a reference mark rm in a color other than black, a similar calculation for those of RGB images corresponding to the colors of the reference mark rm may be performed to determine correlation.

Referring back to FIG. 15, the patch measurement device 27$i$ determines whether or not the calculation of the correlation coefficient ρm at step S564 has been performed so as to be centered around every one of the plurality of pixels in the designated line for calculation (step S565). If there is any pixel for which a correlation coefficient ρm has not been calculated, the pixel for calculation at step S564 is shifted by one pixel along the second printing direction (step S568), and the control returns to step S564 with the resultant new pixel for calculation. On the other hand, if the patch measurement device 27$i$ determines at step S565 that a correlation coefficient ρm has been calculated with respect to every one of the plurality of pixels at step S564, the control proceeds to the next step 566.

Next, the patch measurement device 27$i$ determines whether or not the calculation of correlation coefficients ρm at step S564 has been performed for all of the plurality of pixel lines designated at step S561 (step S566). If there is any pixel line for which correlation coefficients ρm have not been calculated, the line for calculation at step S563 is shifted by one line along the first printing direction (step S569), and the control returns to step S563 with the resultant new line for calculation. On the other hand, if the patch measurement device 27$i$ determines at step S566 that the calculation of correlation coefficients ρm in step S564 has been performed for all of the plurality of pixel lines, the control proceeds to the next step S567.

At step S567, the patch measurement device 27$i$ detects the maximum value among a number of correlation coefficients ρm calculated at step S564, and determines the pixel position associated with the detected maximum value as the position of the crosspoint p of the reference mark rm. Thus, all processing illustrated in this flowchart is completed.

In the above-described flowchart, a maximum correlation coefficient ρm is detected at step S567 from among all of the calculation results having been obtained. Alternatively, the calculation results may be constantly compared every time a new correlation coefficient ρm is calculated at step S564 and only the larger correlation coefficient ρm may be stored each time, so that the correlation coefficient ρm which remains at the last round is always the maximum value.

Although the above embodiment illustrates an example where the outputs of the CCD line sensors 2607 are represented as digital values in the range from "0h" to "6000h", it is also applicable to employ analog output values for the calculation of correlation coefficients ρm.

Although the above embodiment illustrates an example where the reference mark rm is in the form of a cross mark c, any other shape may be used. Although the illustrated key pattern x has a linear pattern consisting of thirteen pixels, any other number of pixels may be used, and any pattern other than a linear pattern may be used. For example, the present invention is also applicable where the key pattern x has a two-dimensional pattern.

Thus, in accordance with the patch measurement device 27$i$ of the second embodiment, a correlation coefficient is calculated with respect to a key pattern representing a reference mark, whereby the signal levels and shape thereof can be known with certainty. Therefore, the reference mark can be accurately detected. Thus, a clearly high correlation can be detected relative to any pixels having signal levels close to those of the key pattern or any pattern resembling the key pattern due to flares in the optical system, print smears, and the like. Moreover, the patch measurement device 27$i$ only needs to search the aforementioned read-out region (as opposed to the entire printed material S) for a reference mark, and the calculation of correlation coefficients ρm by the patch measurement device 27$i$ can be realized by employing a simple formula, without having to calculate conventionally-used standard deviations. Thus, the reference mark detection process is facilitated, and the processing speed can be enhanced.

Although the imaging device 26 in the above printing apparatus 2 is illustrated as being provided near the discharge unit 241 to which printed materials S are discharged, the imaging device 26 may alternatively be disposed so as to image a printed material S which is being transported on the impression cylinder 235 or the discharge drum 237. Although color chart data Dcc is illustrated as being added at the terminal 1, color chart data which has been RIP-processed may alternatively be added to previously RIP-processed image-to-print data at the print control section 21 or the like. Although two imaging units 2602 are disposed side-by-side in the printing apparatus 2, one or three or more imaging units 2602 may alternatively be provided. Although the printing apparatus 2 is illustrated as printing the control strips cs at trailing end of the image im, the control strips cs may be alternatively printed at the leading end. The control strips cs may be disposed at a position immediately after the image im, at a position which is a predetermined distance away from the image im, or at any fixed position on the printing paper.

Although the above embodiment illustrates an example where the color density of patches composing a control strip cs is measured in-line within the printing apparatus 2, it will be appreciated that the present invention is also applicable to a separate measurement device for measuring the color density of printed material independently of the printing apparatus 2. The measurement device according to the present invention may be incorporated in a conventional printing apparatus. A program for calculating the correlation coefficient according to the present invention may be adopted in a conventional printing apparatus comprising an in-line measurement device.

While the invention has been described in detail, the foregoing description is in all aspects illustrative and not restrictive. It is understood that numerous other modifications and variations can be devised without departing from the scope of the invention.

What is claimed is:

1. A patch measurement device for measuring color density of a patch in a control strip printed on paper, the paper having a reference mark for facilitating positioning printed at a predetermined distance from the patch, wherein the patch measurement device comprises:

a storage section for storing imaged data representing at least the control strip and the reference mark on the paper;

a reference mark detection section for detecting the reference mark based on the imaged data stored in the storage section;

a pixel extraction section for extracting, from the imaged data stored in the storage section, pixels composing the patch and surrounding pixels by referring to the reference mark detected by the reference mark detection section;

a patch position detection section for detecting a position of the patch based on values of the pixels extracted by the pixel extraction section; and a color density measurement section for measuring color density of the patch based on the value of at least one pixel located at the position detected by the patch position detection section.

2. The patch measurement device according to claim 1, wherein the patch position detection section comprises:

a data sequence extraction section for extracting a predetermined number of data sequences from the pixels extracted by the pixel extraction section, each data sequence being composed of a predetermined number of pixel values encompassing a portion of the patch; and a distribution calculation section for calculating, for each data sequence extracted by the data sequence extraction section, a distribution profile of the pixel values composing the data sequence, wherein the patch position detection section detects the position of the patch based on the distribution profiles calculated by the distribution calculation section.

3. The patch measurement device according to claim 2, wherein the distribution calculation section inputs the pixel values composing each data sequence to a predetermined function to calculate a kurtosis of the distribution profile, wherein the patch position detection section detects a center of the patch based on the kurtoses calculated by the distribution calculation section, and wherein the color density measurement section measures the color density of the patch based on the value of at least one pixel located at the center of the patch detected by the patch position detection section.

4. The patch measurement device according to claim 3, wherein the predetermined function is a Kurt function.

5. The patch measurement device according to claim 4, wherein:

the patch printed on the paper is rectangular-shaped;

the imaged data includes M×N pixels (where M and N are natural numbers) representing the patch, along a first dimension direction and a second dimension direction, respectively, wherein the second dimension direction is perpendicular to the first dimension direction, wherein, from the imaged data stored in the storage section, the pixel extraction section extracts P×Q pixel values composing the patch and a surrounding periphery thereof by referring to the reference mark detected by the reference mark detection section, wherein P is the number of pixels present along the first dimension direction and Q is the number of pixels present along the second dimension direction, wherein, from each row of P pixels present along the first dimension direction extracted by the pixel extraction section, the data sequence extraction section extracts data sequences each composed of R pixel values (where R is a natural number smaller than P), the respective data sequences being shifted by one pixel along the first dimension direction and containing different sets of R pixel values, wherein, for each data sequence, the distribution calculation section inputs the R pixel values composing the data sequence to the predetermined Kurt function to calculate the kurtosis of the distribution profile, and wherein, based on the kurtoses of the distribution profiles calculated by the distribution calculation section, the patch position detection section detects a center of the patch for each of the Q rows present along the second dimension direction.

6. The patch measurement device according to claim 5, wherein R is an odd number greater than M.

7. The patch measurement device according to claim 1, wherein the reference mark detection section comprises:

an image pattern extraction section for extracting from the imaged data an image pattern approximately corresponding to a predetermined reference pixel pattern of the reference mark, the image pattern being sequentially shifted by a predetermined number of pixels;

a correlation coefficient calculation section for calculating a correlation coefficient by subtracting, from a sum of multiplication products of corresponding elements of the reference pixel pattern and the image pattern, a sum of multiplication products of corresponding elements of an inverted pixel pattern of the reference pixel pattern and the image pattern; and a reference mark position detection section for detecting a maximum value among a number of said correlation coefficients calculated by the correlation coefficient calculation section, and determining the position of the pixel associated with the maximum value as the position of the reference mark on the paper.

8. The patch measurement device according to claim 7, wherein the calculation of the correlation coefficient by the correlation coefficient calculation section comprises dividing the reference pixel pattern and the inverted pixel pattern, each by a weighting factor representative of a pattern shape of the respective pattern.

9. The patch measurement device according to claim 7, wherein the imaged data stored in the storage section is generated for each of RGB colors, and wherein the correlation coefficient calculation section calculates the correlation coefficient for imaged data of each of RGB colors, in accordance with the color of the reference mark.

10. The patch measurement device according to claim 1, wherein the patch measurement device is provided in a printing apparatus for printing a plurality of colors on the paper, and wherein the imaged data is generated by imaging the control strip and the reference mark while the paper is being transported in a sheet form in the printing apparatus while being gripped at one end thereof.

11. The patch measurement device according to claim 10, wherein the printing apparatus is of a type including a prepressing mechanism for forming, based on image data representing a subject image to be printed, printing the subject image, the control strip and the reference mark on a printing plate.

12. A patch measurement device for measuring color density of a patch in a control strip printed on paper, wherein the patch measurement device comprises:

a storage section for storing imaged data representing the control strip on the paper;

a patch position detection section for detecting a position of the patch based on the values of pixels composing the imaged data stored in the storage section; and a color density measurement section for measuring color density of the patch whose position is detected by the patch position detection section.

13. The patch measurement device according to claim 12, wherein the imaged data comprises pixels representing the patch, and wherein the patch position detection section comprises:

a data sequence extraction section for extracting a predetermined number of data sequences from the imaged data stored in the storage section, each data sequence being composed of a predetermined number of pixel values encompassing a portion of the patch and a surrounding periphery thereof; and a distribution calculation section for calculating, for each data sequence extracted by the data sequence extraction section, a distribution profile of the pixel values composing the data sequence, wherein the patch position detection section detects the position of the patch based on the distribution profiles calculated by the distribution calculation section.

14. The patch measurement device according to claim 13, wherein the distribution calculation section inputs the pixel values composing each data sequence to a predetermined function to calculate a kurtosis of the distribution profile, wherein the patch position detection section detects a center of the patch based on the kurtoses calculated by the distribution calculation section, and wherein the color density measurement section measures the color density of the patch based on the value of at least one pixel located at the center of the patch detected by the patch position detection section.

15. The patch measurement device according to claim 14, wherein the predetermined function is a Kurt function.

16. The patch measurement device according to claim 13, wherein:

a reference mark is printed on the paper at a predetermined distance from the patch; and the imaged data comprises at least one pixel representing the reference mark, wherein the patch measurement device further comprises a reference mark detection section for detecting the reference mark based on the imaged data stored in the storage section, and wherein the patch position detection section further comprises a pixel extraction section for extracting, from the imaged data stored in the storage section, pixels composing the patch and surrounding pixels by referring to the reference mark detected by the reference mark detection section, and wherein the data sequence extraction section extracts a predetermined number of data sequences from the pixels extracted by the pixel extraction section, each data sequence being composed of a predetermined number of pixel values encompassing a portion of the patch.

17. The patch measurement device according to claim 16 wherein:

the patch printed on the paper is rectangular-shaped;

the imaged data includes M×N pixels (where M and N are natural numbers) representing the patch, along a first dimension direction and a second dimension, respectively, wherein the second dimension direction is perpendicular to the first dimension direction, wherein, from the imaged data stored in the storage section, the pixel extraction section extracts P×Q pixel values composing the patch and a surrounding periphery thereof by referring to the reference mark detected by the reference mark detection section, wherein P is the number of pixels present along the first dimension direction and Q is the number of pixels present along the second dimension direction, wherein, from each row of P pixels present along the first dimension direction extracted by the pixel extraction section, the data sequence extraction section extracts data sequences each composed of R pixel values (where R is a natural number smaller than P), the respective data sequences being shifted by one pixel along the first dimension direction and containing different sets of R pixel values, wherein, for each data sequence, the distribution calculation section inputs the R pixel values composing the data sequence to the predetermined Kurt function to calculate a kurtosis of the distribution profile, and wherein, based on the kurtoses of the distribution profiles calculated by the distribution calculation section, the patch position detection section detects a center of the patch for each of the Q rows present along the second dimension direction.

18. The patch measurement device according to claim 17, wherein R is an odd number greater than M.

19. The patch measurement device according to claim 12, wherein the patch measurement device is provided in a printing apparatus for printing a plurality of colors on the paper, and wherein the imaged data is generated by imaging the control strip and the reference mark while the paper is being transported in a sheet form in the printing apparatus while being gripped at one end thereof.

20. A patch measurement method for measuring color density of a patch in a control strip printed on paper, the paper having a reference mark for facilitating positioning printed at a predetermined distance from the patch, wherein the patch measurement method comprises:

a storage step of storing imaged data representing at least the control strip and the reference mark on the paper;

a reference mark detection step of detecting the reference mark based on the imaged data stored by the storage step;

a pixel extraction step of extracting, from the imaged data stored by the storage step, pixels composing the patch and surrounding pixels by referring to the reference mark detected by the reference mark detection step;

a patch position detection step of detecting a position of the patch based on values of the pixel extracted by the pixel extraction step; and a color density measurement step of measuring color density of the patch based on the value of at least one pixel located at the position detected by the patch position detection step.

21. The patch measurement method according to claim 20, wherein the imaged data comprises pixels representing the patch, and wherein the patch position detection step comprises:

a data sequence extraction step of extracting a predetermined number of data sequences from the pixels extracted by the pixel extraction step, each data sequence being composed of a predetermined number of pixel values encompassing a portion of the patch; and a distribution calculation step of calculating, for each data sequence extracted by the data sequence extraction step, a distribution profile of the pixel values composing the data sequence, wherein the patch position detection step detects the position of the patch based on the distribution profiles calculated by the distribution calculation step.

22. The patch measurement method according to claim 21, wherein the distribution calculation step inputs the pixel values composing each data sequence to a predetermined function to calculate a kurtosis of the distribution profile, wherein the patch position detection step detects a center of the patch based on the kurtoses calculated by the distribution calculation step, and wherein the color density measurement step measures the color density of the patch based on the value of at least one pixel located at the center of the patch detected by the patch position detection step.

23. The patch measurement method according to claim 22, wherein the predetermined function is a Kurt function.

24. The patch measurement method according to claim 23, wherein:

the patch printed on the paper is rectangular-shaped;

the imaged data includes M×N pixels (where M and N are natural numbers) representing the patch, along a first dimension direction and a second dimension, respectively, wherein the second dimension direction is perpendicular to the first dimension direction, wherein, from the imaged data stored by the storage step, the pixel extraction step extracts P×Q pixel values composing the patch and a surrounding periphery thereof by referring to the reference mark detected by the reference mark detection step, wherein P is the number of pixels present along the first dimension direction and Q is the number of pixels present along the second dimension direction, wherein, from each row of P pixels present along the first dimension direction extracted by the pixel extraction step, the data sequence extraction step extracts data sequences each composed of R pixel values (where R is a natural number smaller than P), the respective data sequences being shifted by one pixel along the first dimension direction and containing different sets of R pixel values, wherein, for each data sequence, the distribution calculation step inputs the R pixel values composing the data sequence to the predetermined Kurt function to calculate the kurtosis of the distribution profile, and wherein, based on the kurtoses of the distribution profiles calculated by the distribution calculation step, the patch position detection step detects a center of the patch for each of the Q rows present along the second dimension direction.

25. The patch measurement method according to claim 24, wherein R is an odd number greater than M.

26. The patch measurement method according to claim 20, wherein the reference mark detection step comprises:

an image pattern extraction step of extracting from the imaged data an image pattern approximately corresponding to a predetermined reference pixel pattern of the reference mark, the image pattern being sequentially shifted by a predetermined number of pixels;

a correlation coefficient calculation step of calculating a correlation coefficient by subtracting, from a sum of multiplication products of corresponding elements of the reference pixel pattern and the image pattern, a sum of multiplication products of corresponding elements of an inverted pixel pattern of the reference pixel pattern and the image pattern; and a reference mark position detection step of detecting a maximum value among a number of said correlation coefficients calculated by the correlation coefficient calculation step, and determining the position of the pixel associated with the maximum value as the position of the reference mark on the paper.

27. The patch measurement method according to claim 26, wherein the calculation of the correlation coefficient by the correlation coefficient calculation step comprises dividing the reference pixel pattern and the inverted pixel pattern, each by a weighting factor representative of a pattern shape of the respective pattern.

28. The patch measurement method according to claim 26, wherein the imaged data stored by the storage step is generated for each of RGB colors, and wherein the correlation coefficient calculation step calculates the correlation coefficient for imaged data of each of RGB colors, in accordance with the color of the reference mark.

29. The patch measurement method according to claim 26, wherein the imaged data is generated by imaging the control strip and the reference mark while the paper is being transported in a sheet form while being gripped at one end thereof.

30. A patch measurement method for measuring color density of a patch in a control strip printed on paper, wherein the patch measurement method comprises:

a storage step of storing imaged data representing the control strip on the paper;

a patch position detection step of detecting a position of the patch based on the values of pixels composing the imaged data stored by the storage step; and a color density measurement step of measuring color density of the patch whose position is detected by the patch position detection step.

31. The patch measurement method according to claim 30, wherein the imaged data comprises pixels representing the patch, and wherein the patch position detection step comprises:

a data sequence extraction step of extracting a predetermined number of data sequences from the imaged data stored by the storage step, each data sequence being composed of a predetermined number of pixel values encompassing a portion of the patch and a surrounding periphery thereof; and a distribution calculation step of calculating, for each data sequence extracted by the data sequence extraction step, a distribution profile of the pixel values composing the data sequence, wherein the patch position detection step detects the position of the patch based on the distribution profiles calculated by the distribution calculation step.

32. The patch measurement method according to claim 31, wherein the distribution calculation step inputs the pixel values composing each data sequence to a predetermined function to calculate a kurtosis of the distribution profile, wherein the patch position detection step detects a center of the patch based on the kurtoses calculated by the distribution calculation step, and wherein the color density measurement step measures the color density of the patch based on the value of at least one pixel located at the center of the patch detected by the patch position detection step.

* * * * *